(12) United States Patent
Kondo et al.

(10) Patent No.: US 6,330,344 B1
(45) Date of Patent: *Dec. 11, 2001

(54) IMAGE PROCESSING DEVICE AND METHOD EMPLOYING MOTION DETECTION TO GENERATE IMPROVED QUALITY IMAGE FROM LOW RESOLUTION IMAGE

(75) Inventors: Tetsujiro Kondo; Tsutomu Watanabe, both of Kanagawa; Tomoyuki Ohtsuki, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,358

(22) Filed: Feb. 10, 1998

(30) Foreign Application Priority Data

Feb. 14, 1997 (JP) .................................................. 9-030181
Sep. 26, 1997 (JP) .................................................. 9-261934

(51) Int. Cl.⁷ ............................................................ G06K 9/00
(52) U.S. Cl. ............................................. 382/107; 382/236
(58) Field of Search .................................... 382/236, 107, 382/253, 108, 109, 111, 112; 400/615.2; 345/112, 116, 328, 329, 340, 345

(56) References Cited

U.S. PATENT DOCUMENTS

| | | | |
|---|---|---|---|
| 5,111,511 | * 5/1992 | Ishii et al. .......................... | 382/107 |
| 5,367,340 | * 11/1994 | Spencer ............................... | 348/607 |
| 5,381,183 | * 1/1995 | Ishizuka et al. .................... | 348/458 |
| 5,485,611 | * 1/1996 | Astle .................................... | 395/600 |
| 5,517,588 | 5/1996 | Kondo . | |
| 5,557,298 | * 9/1996 | Yang et al. .......................... | 345/340 |
| 5,584,591 | * 12/1996 | Mori et al. ........................ | 400/615.2 |
| 5,588,067 | * 12/1996 | Peterson et al. .................... | 382/103 |
| 6,104,439 | * 8/2000 | Jeong et al. ........................ | 348/699 |

FOREIGN PATENT DOCUMENTS 0 649 256   4/1995   (EP) .
0 294 957   12/1998   (EP) .

OTHER PUBLICATIONS

Irani M et al: "Motion Analysis For Image Enhancement: Resolution, Conclusion, And Transparency" Journal Of Visual Communication And Image Representation, vol. 4, No. 4, Dec. 1, 1993, pp. 324–335, XP000578760.

Patti A J et al: "High Resolution Standards Conversion Of Low Resolution Video" Proceedings Of The International Conference On Acoustics, Speech, And Signal Processing (ICASSP), Detroit, May 9–12, 1995 Image And Multi–Dimensional Signal Processing/Signal Processing Applications Development, vol. 4, No. Conf. 20, May 9, 1995, pp. 2197–2200, XP000535391.

Murat Tekalp A et al: "High–Resolution Image Reconstruction From Lower–Resolution Image Sequences And Space–Varying Image Restoration" Proceedings Of The International Conference On Acoustics, Speech And Signal Processing, US, New York, IEEE, vol. Conf. 17, 1992, pp. 169–172, XP000378900.

* cited by examiner

*Primary Examiner*—Andrew W. Johns
*Assistant Examiner*—Seye D. Azarian
(74) *Attorney, Agent, or Firm*—Frommer Lawrence & Haug LLP; William S. Frommer; Glenn F. Savit

(57) ABSTRACT

An image signal converting apparatus for converting a first image signal into a second image signal, where the first and second image signals include a plurality of pictures of different frames. A motion detector is operable to detect motion of the first image signal between a first frame and a second frame, and processing circuitry produces the second image signal based on an assumption of a pixel at a position corresponding to the detected motion. The apparatus may be employed to produce an output signal of either the same resolution as the first image signal with aliasing distortion reduced or eliminated, or with higher resolution in vertical and/or horizontal directions.

64 Claims, 26 Drawing Sheets

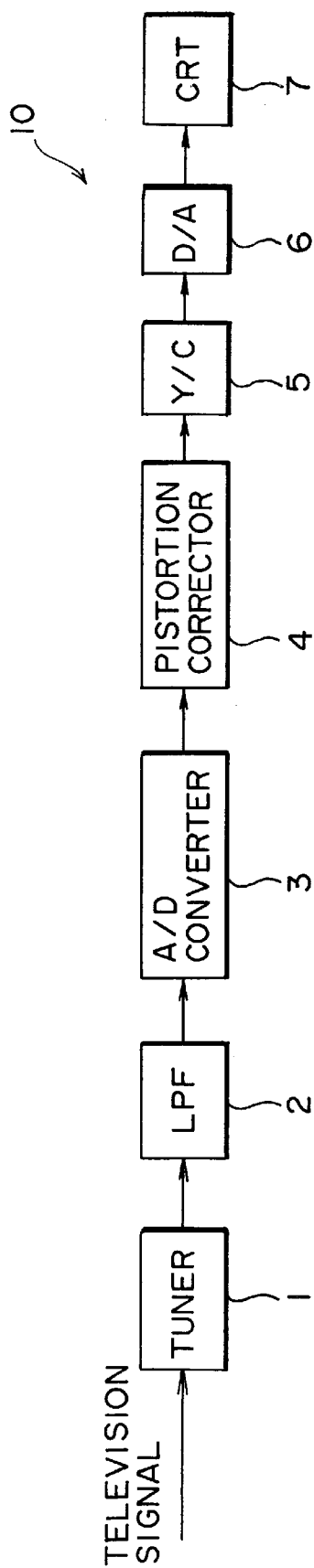

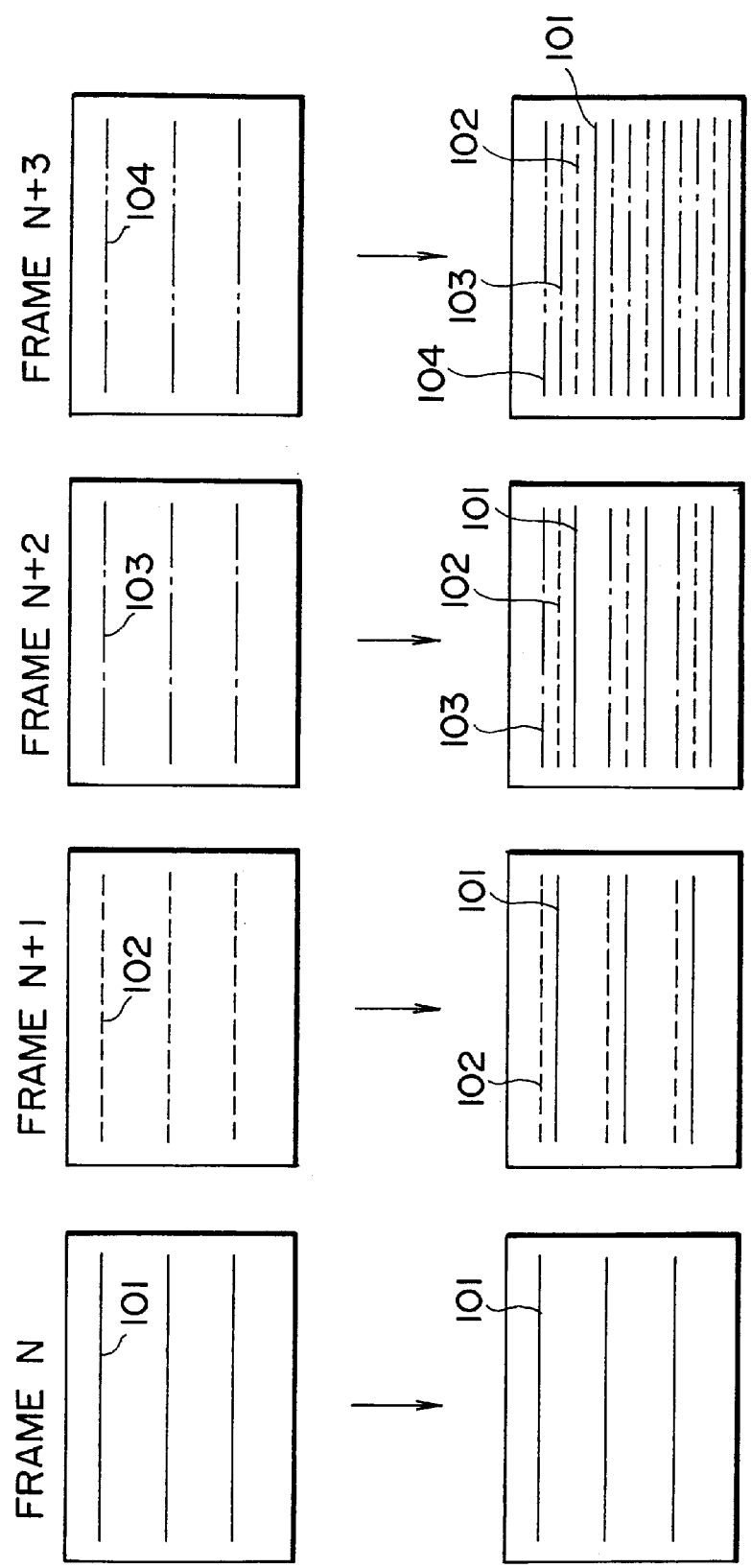

FIG. 19

○ – SD PIXEL
× – HD PIXEL

FIG. 24
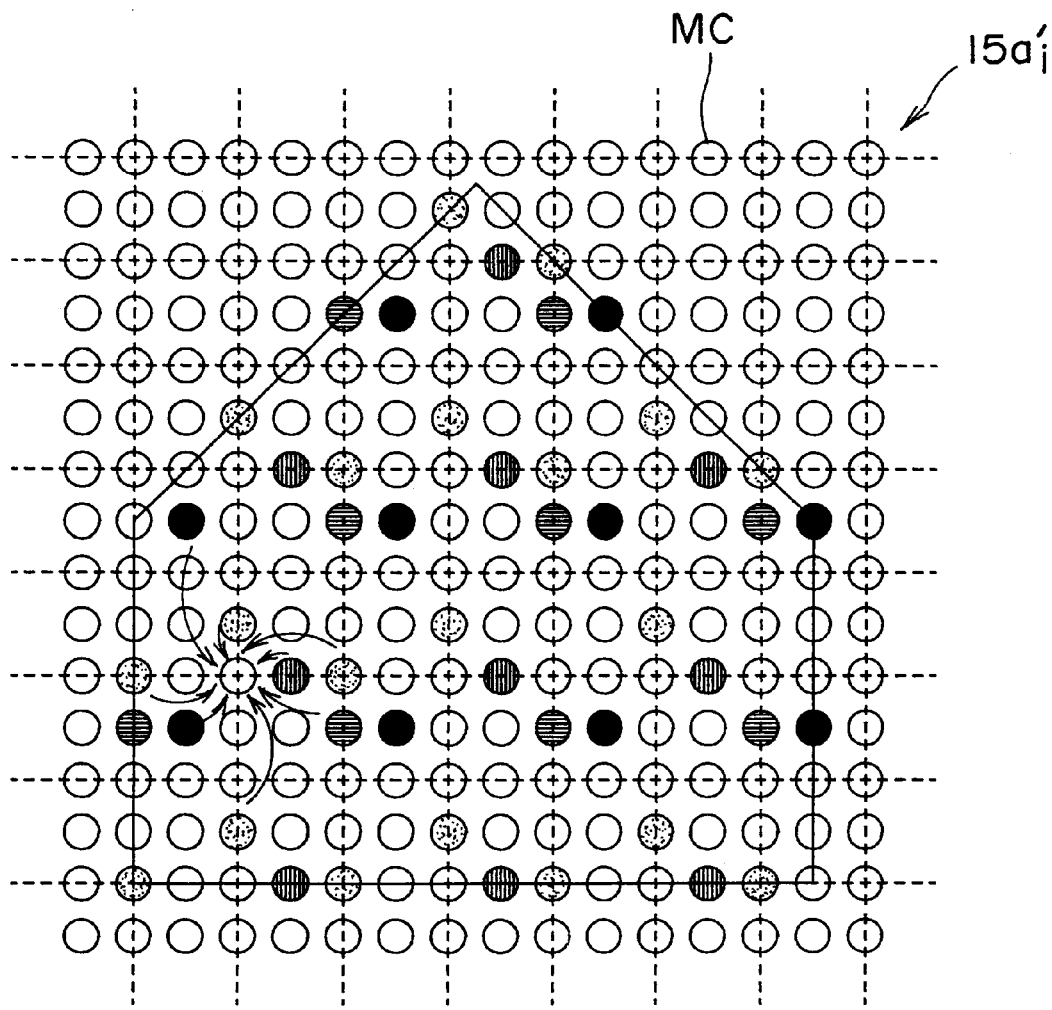
MOTION VECTOR
|   |     | x     | y     |
|---|-----|-------|-------|
| ○ | N-4: | -1.25 | +0.50 |
| ⊙ | N-3: | -0.75 | +0.75 |
| ● | N-2: | -0.50 | +1.25 |
| ⊜ | N-1: | -0.25 | +0.25 |
| ⦀ | N:   | 0     | 0     |
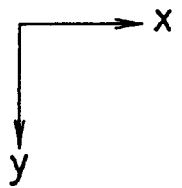

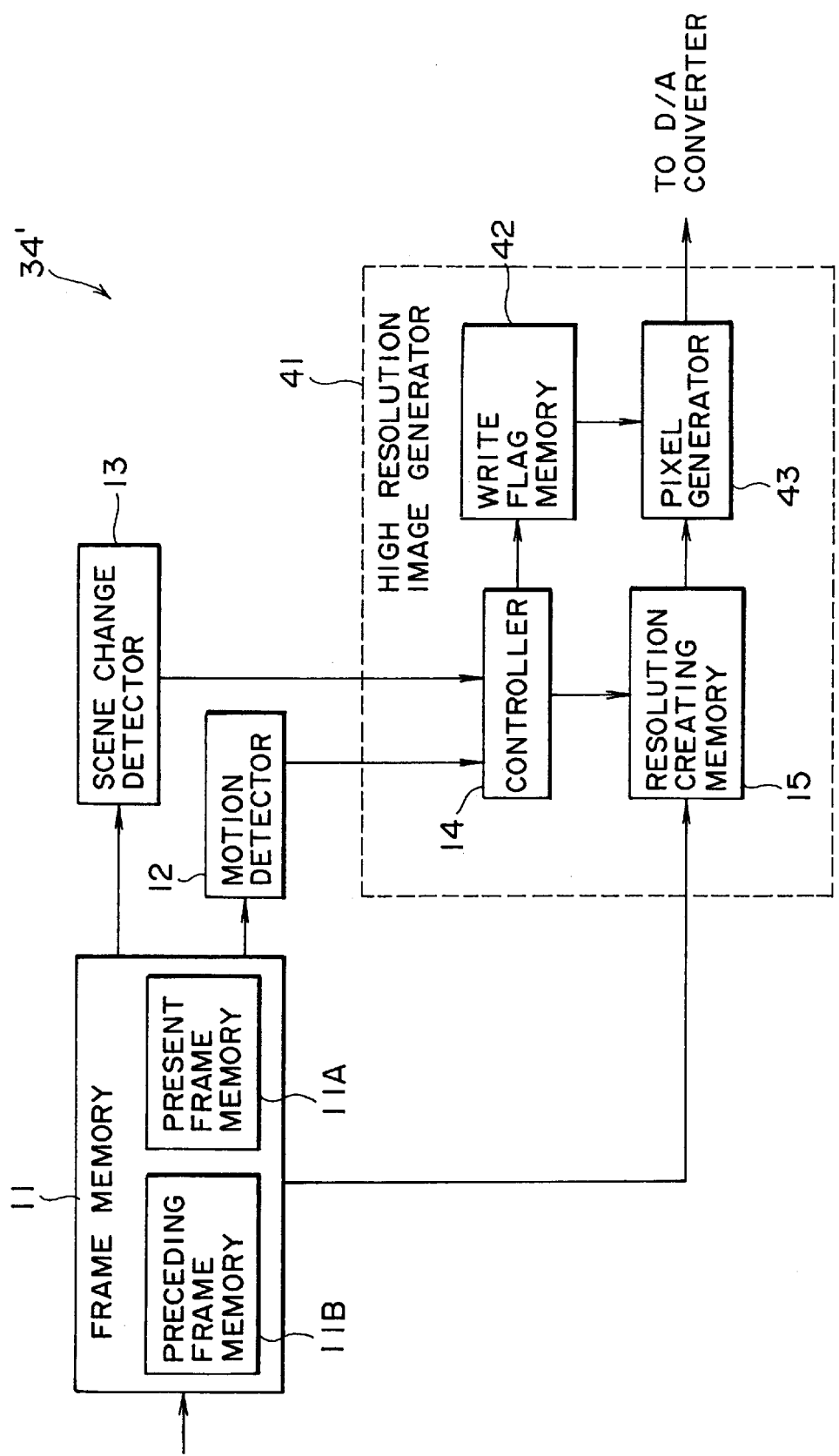

IMAGE PROCESSING DEVICE AND METHOD EMPLOYING MOTION DETECTION TO GENERATE IMPROVED QUALITY IMAGE FROM LOW RESOLUTION IMAGE

BACKGROUND OF THE INVENTION

The present invention relates generally to image processing, and in particular, to an image processing device and method for reducing aliasing distortion due to undersampling of an image. The invention also relates to a technique for generating a high resolution image by increasing the number of pixels of a low resolution image.

With modern digital imaging techniques, analog video signals are sampled and stored as digital data for subsequent reproduction on a cathode ray tube (CRT) or other display. It is a design goal to display such images with as high a resolution and as little distortion as possible.

Images displayed on a CRT, such as images derived from television signals, video tape recorders (VTRs) or from digital versatile disc (DVD) players, are generated by repetitive scanning of electron beams in the horizontal direction. As illustrated in FIG. 25., each horizontal scan is performed from left to right, and after each scan, the beams are swept back to the extreme left and re-positioned vertically to commence the next horizontal scan. The fluorescent screen of the CRT is irradiated by three electron beams to illuminate respective blue, green and red phosphors distributed in small units on the screen. The phosphors produce points of light corresponding to the intensity of the electron beams, and the congregation of all the points produces an image. Hence, a displayed image can be considered a congregation of such points, that is, pixels.

Since a displayed image on a CRT derived from an analog signal is composed of a congregation of light emitting pixels, the image can be envisioned as a digital signal obtained by sampling the original image at the pixel positions. Thus, if the original analog image were sampled at a sufficient sampling interval in both horizontal and vertical directions to generate the same number of points as the number of pixels on a CRT, a collection of image data could be stored digitally. When subsequently reproduced, an image of nearly the same resolution is obtained as in a strictly analog recording/reproduction approach.

The sampling theorem dictates that an analog signal can be reconstructed completely from a set of uniformly spaced discrete samples thereof in time, provided that the signal is sampled at a rate of at least twice the highest frequency component of the signal. When sampling an original image, if the sampling theorem is not satisfied, aliasing distortion is generated in the displayed image. To correct for aliasing distortion, prefilters have been used to compensate for undersampling in the horizontal (scanning line) direction; however, such prefilters are not typically provided in the vertical direction. As such, aliasing distortion in the vertical direction is a common problem.

FIG. 26 illustrates aliasing distortion of a displayed image in the vertical direction. Four pixels $P_1$–$P_4$ of a given column are shown in each of frames N and N+1. Signals $S_N$ and $S_{N+1}$ represent the image level variation of the original image in the vertical direction for the given column, where the amplitude level is illustrated horizontally in the figure. Thus, for example, in frame N, the luminance of the image is higher for pixel $P_2$ than for pixel $P_1$. Now, if the highest spatial frequency component of the original image in the vertical direction has a period of less than twice the horizontal spacing between pixels, then the sampling theorem is not satisfied and aliasing distortion results. Such is the case for both signals $S_N$ and $S_{N+1}$ in FIG. 26. For instance, signal $S_N'$, which is an approximation for the sampled signal of frame N, is markedly different from the original signal $S_N$. With the aliasing distortion, the high frequency component of the original signal will be lost during reproduction, even if a filter to remove aliasing is employed in the vertical direction. Such aliasing distortion may be a cause of degradation in signal processing such as Y/C separation, noise removal, quality improvement, and so forth.

It is noted that while undersampling of the image as just discussed will always result in diminished resolution, the effect on the viewer in terms of picture quality depends on how the scene changes from frame to frame. If a frame with aliasing distortion changes significantly from frame to frame, as is the case in FIG. 26, then an unnatural moving image or blurring results from the perspective of the user. If the scene remains still, the aliasing noise is not as great. In any event, since resolution is always degraded by undersampling, and since the signals of standard television broadcasts and the like are intended for only a limited number of horizontal sweeps per frame, there is a need for a practical way to remove aliasing and recapture the original image with improved quality.

OBJECTS AND SUMMARY OF THE INVENTION

It is, therefore, an object of the invention to provide a way to convert an undersampled image signal into an output image signal with aliasing distortion reduced or eliminated.

It is another object of the invention to generate a high resolution image from a low resolution image.

It is yet another object of the invention to improve the quality of a displayable image generated from a low quality input image signal.

Various other objects and advantages of the invention will become readily apparent to those of ordinary skill in the art, and the novel features will be particularly pointed out in the appended claims.

In an illustrative embodiment of the invention, there is provided an image signal converting apparatus for converting a first image signal into a second image signal, where the first and second image signals each include a plurality of pictures of different frames. The apparatus includes a motion detector operable to detect motion of the first image signal between a first frame and a second frame, and processing circuitry for producing the second image signal based on an assumption of a pixel at a position corresponding to the detected motion.

The apparatus may be employed to produce an output signal of either the same resolution as the first image signal with aliasing distortion reduced or eliminated, or with higher resolution in vertical and/or horizontal directions. The motion detector preferably detects the motion of the first image signal by a finer amount than a pixel size of the first image signal. The processing circuitry may be composed of a resolution creating memory for storing a picture of the first image signal and having a larger storage capacity than an amount of data within one picture of the first image signal, and a controller operable to control writing of the first image signal into the resolution creating memory and reading of a new image signal from the memory. The controller writes the first image signal in the memory in accordance with the detected motion of the first image signal.

In another embodiment, the image converting apparatus includes an area divider for defining at least first and second image areas of a picture, where motion is detected in each of the image areas. In this case, first and second image areas of the second image signal are generated based on an assumption of pixels at positions corresponding to the detected motion in the respective first and second image areas of the first image signal. A combiner combines the first and second image areas of the second signal to generate a composite image.

In one application, the first image signal may be a standard definition (SD) image signal which is converted to a high definition (HD) image signal as the second image signal having twice the resolution of the SD signal in both the horizontal and vertical directions. For some of the frames, pixels of the HD signal may also be generated by an adaptive processing technique.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 1 is a block diagram of an illustrative television receiver in accordance with the invention;

FIGS. 2A–2B and 3 are diagrams illustrating pixel data creation in accordance with the invention;

FIG. 19 is a diagram illustrating class taps and predictive taps;

FIGS. 23 and 24 illustrate storage of pixel data of the image of FIG. 22;

FIG. 27 is a block diagram of another resolution converter in accordance with the invention.

DETAILED DESCRIPTION OF CERTAIN PREFERRED EMBODIMENTS

Figure 2A:
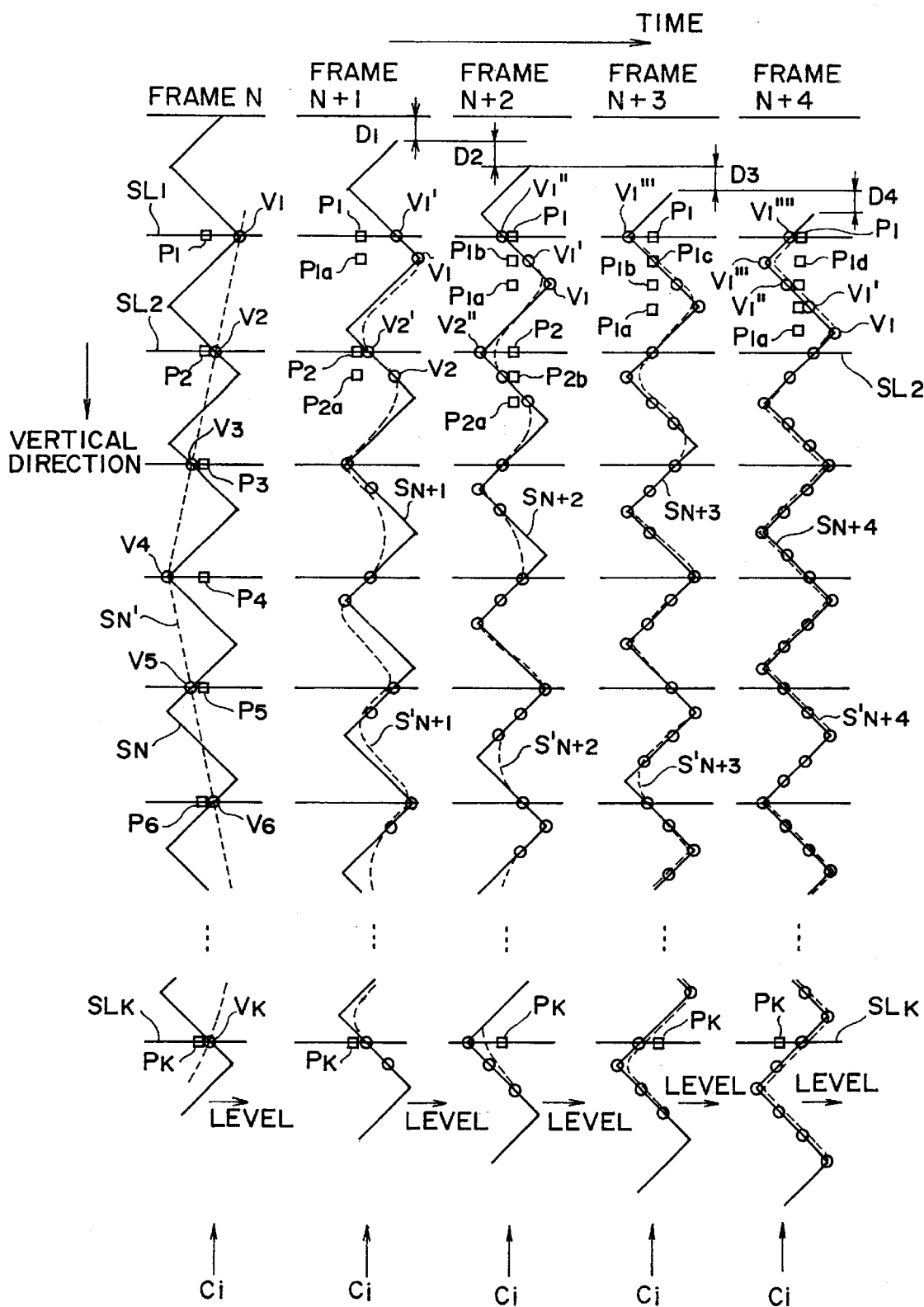

Referring to FIG. 1, a simplified block diagram of a television receiver 10 in accordance with the present invention is shown. Receiver 10 converts an input television signal to a digital signal, corrects the digital signal for aliasing distortion while enhancing its resolution, and then converts the distortion-corrected digital signal back to an analog signal for display.

Receiver 10 includes a tuner 1 for demodulating an input television broadcast signal of a selected band, which is received via an antenna or transmission line. The demodulated signal is applied to low pass filter (LPF) 2, which operates as an aliasing distortion prefilter to filter out high frequency components of the television signal. The filtered output signal of LPF 2 is applied to analog to digital (A/D) converter 3 where it is sampled and digitized. The digitized signal is then provided to distortion corrector 4 which reduces or essentially eliminates aliasing distortion in the vertical direction of the digitized television signal. An image processing circuit such as a Y/C separator 5 is employed between distortion corrector 4 and D/A converter 6 (or alternatively between tuner 1 and LPF 2). Y/C separator 5 separates luminance from chrominance in the output signal from distortion corrector 4. It is noted that in the configuration shown, a composite signal (luminance plus chrominance) is supplied to A/D converter 3, and sampling is performed in accordance with the frequency of the chrominance subcarrier. If, in the alternative, Y/C separation of the television signal is performed prior to the signal being applied to A/D converter 3, then sampling would be performed at a frequency on the order of 13.5 MHz. In either case, D/A converter 6 converts the distortion-corrected output signal of distortion corrector 4 back to an analog signal to be displayed on CRT 7.

The reproduction of an original image from an image having aliasing distortion in the vertical direction, i.e., normal to the horizontal scanning lines, will now be described. Referring to FIG. 2A, the principal of an aliasing distortion removal method performed within distortion corrector 4 is illustrated. The image signal variation in the vertical direction within a given column $C_i$ of each frame of the image is designated as signals $S_N$ to $S_{N+4}$ for frames N to N+4, respectively. Pixels $P_1$ to $P_K$ of column $C_i$ in each frame are located at the respective positions of conventional horizontal scanning lines $SL_1$–$SL_K$. The signal level of each pixel is illustrated horizontally in the figure—for example, in frame N, signal levels $V_1$–$V_k$ correspond to pixels $P_1$–$P_k$, respectively.

In accordance with one embodiment of the present invention, pixels are created at positions in between the conventional horizontal scanning lines to remove aliasing distortion and, optionally, to improve resolution of the displayed image. These inter-scanning line pixels are created in accordance with the motion of the image from frame to frame. To illustrate this concept, reference is first made to frame N, where the signal variation of an original image $S_N$ along column $C_i$ for that frame is shown. Due to the high spatial frequencies within signal $S_N$, vertical sampling at positions corresponding to the horizontal scan lines is insufficient for reproducing all the image information therein, whereby aliasing distortion would result without the pixel creation method of the invention. That is, the vertically oriented image signal based on merely sampling one frame at a time at the conventional horizontal scan lines would resemble a distorted signal $S_N'$ (shown as a dashed line), which is markedly different from the original image signal $S_N$.

To generate inter-scanning line pixels that recapture the original image, frame to frame motion of the image signal is detected. For frame N, the signal values $V_1-V_K$ for the respective pixels are stored in memory. The motion of the image is then detected between frame N and N+1. (Illustrative methods of detecting frame to frame motion will be discussed later). In the example of FIG. 2A, the image moves downward by a distance $D_1$ between frames N and N+1. For frame N+1, the image is again sampled at the horizontal scanning lines to generate signal values $V_1'-V_K'$ for pixels $P_1-P_k$ of frame N+1 and those values are stored in memory. In addition, inter-scanning line pixels $P_{1a}, P_{2a}, \ldots P_{Ka}$ are created and stored in memory, where pixel $P_{1a}$ has the signal value of $V_1$ determined from the frame N sample for pixel $P_1$, pixel $P_2$a has the signal value of $V_2$ determined from the frame N sample for pixel $P_2$, and so forth. The location of pixel $P_{1a}$ in frame N+1 is the distance $D_1$ from scanning line $SL_1$, determined based on the motion from frame N to N+1. Likewise, pixel $P_{2a}$ is located the distance $D_1$ beneath scanning line $SL_2$.

The pixel generation process is repeated for frame N+2, where the image signal $S_{N+2}$ is sampled at the horizontal scan lines to determine signal values $V_1''-V_K''$ for respective pixels $P_1-P_K$ of that frame, and the motion from frame N+1 to frame N+2 is detected. Assuming the image moves down by a distance $D_2$, pixels $P_{1b}, P_{2b}, \ldots, P_{Kb}$ are generated having values of $V_1', V_2', \ldots V_K'$ corresponding to the previously determined values stored in memory for frame N+1, and each located a distance $D_2$ below the respective horizontal scan line $SL_1$. Likewise, frame N+2 contains pixels $P_{1a}, P_{2a}, \ldots, P_{Ka}$ having values of $V_1, V_2, \ldots V_K$, respectively, as previously stored in memory for frame N+1, and each located a distance $(D_1+D_2)$ below $SL_1$.

Figure 2B:
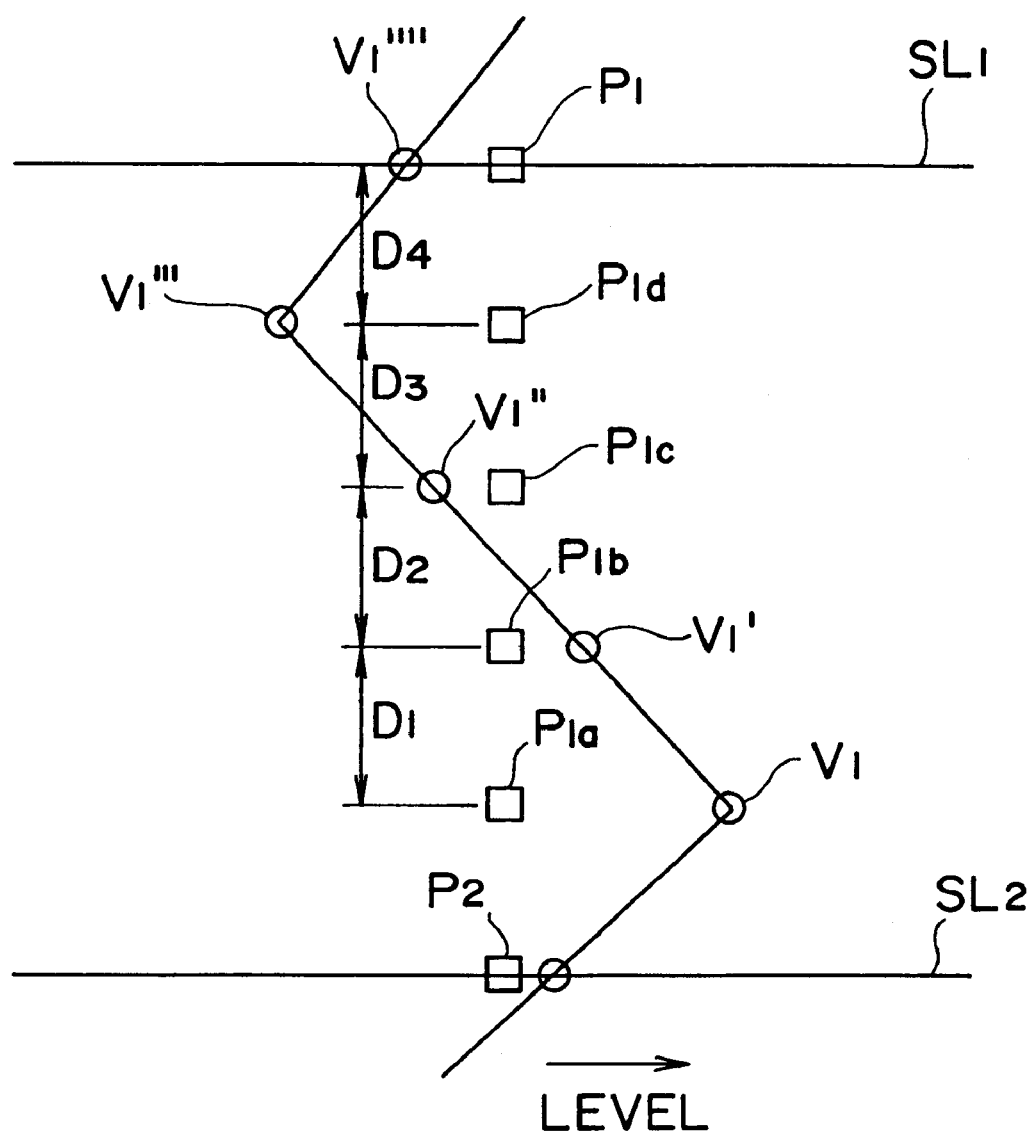

The pixel generation process proceeds for the subsequent frames until a predetermined number of additional pixels are generated. In the example of FIG. 2A, the process continues until frame N+4, which has five times as many pixels in the vertical direction as in frame N. FIG. 2B shows the pixels between scan lines $SL_1$ and $SL_2$ of frame N+4. It is assumed that the image moved down by a distance $D_3$ between frames N+2 and N+3, and by a distance $D_4$ between frames N+3 and N+4. Thus, frame N+4 has a pixel $P_1$ of value $V_1''''$ corresponding to the level of signal $S_{N+4}$ at position $SL_1$, as well as pixels $P_{1d}, P_{1c}, P_{1b}$ and $P_{1a}$ of values $V_1''', V_1'', V_1'$ and $V_1$, respectively, where $P_{1d}$ is a distance $D_4$ below $SL_1$, $P_{1c}$ is a distance $(D_3+D_4)$ below $SL_1$, and so on. Of course, more or fewer additional pixels can be generated as a function of the resolution desired. In any event, in the present example, all frames subsequent to frame N+4 will have five times as many pixels in the vertical direction as the number of horizontal scan lines.

Accordingly, pixel generation is accomplished by assuming pixels at locations corresponding to the motion. Practically, however, it is desirable to represent an image with uniformly spaced samples. In the above example, if the inter-frame motion is non-uniform such that the distances $D_1-D_4$ are unequal, the pixels that are created will be non-uniformly spaced. However, by appropriately rounding off the inter-frame motion, pixels of uniform spacing can be derived and stored in memory. Assuming that frame N+4 is thus represented by uniformly spaced pixels in the vertical direction (at five times the number of scanning lines in this example), each frame thereafter can be represented by the same number of uniformly spaced pixels.

In the example of FIG. 2A, it was assumed that inter-frame motion of the image was strictly in the vertical direction. To remove aliasing distortion and increase the number of pixels in the vertical direction when the original image is moving in both horizontal and vertical directions, horizontal motion should be taken into account as well. To this end, a motion vector is computed from frame to frame as will be discussed more fully below. In addition, different portions of the image within the frame typically move in different directions. Certain embodiments of the invention take such divergent motion into account as well by analyzing different blocks of each frame separately.

FIG. 3 is a diagram illustrating the general concept of enhancing resolution and removing aliasing by creating pixels based on image data from previous frames and frame to frame image movement. The upper part of the diagram shows frames N to N+3 with image data 101–104, respectively, along common horizontal scan lines. Assuming that the image moves incrementally downward from frame N to N+3, additional pixels are generated in between the scan lines based on the data from the previous frame and the image motion as described above. Thus, frame N+1 is enhanced with pixel data 101 of frame N; pixel data 101, 102 is added to frame N+2 and pixel data 101, 102 and 103 is added to frame N+3 to generate a high resolution image with four times as many pixels in the vertical direction as compared to the original frame.

Figure 4:
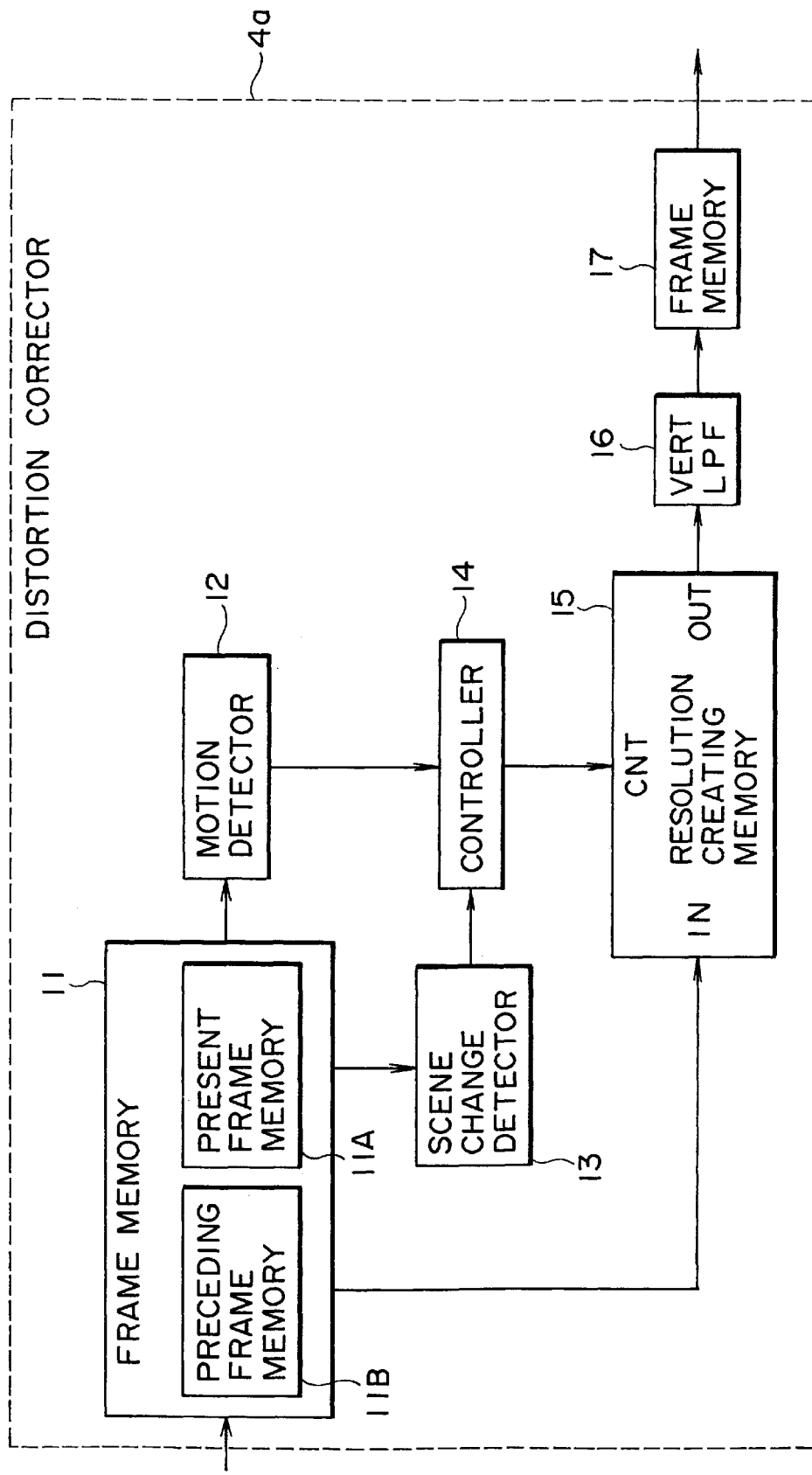
FIG. 4 is a block diagram of the distortion corrector of FIG. 1.

Referring now to FIG. 4, a block diagram of an illustrative configuration for distortion corrector 4 is depicted. A frame memory 11 receives input image data applied to the distortion corrector. The input image data is assumed to correspond to an undersampled image signal such that aliasing distortion would result if the frames were simply reproduced without any resolution-enhancing pixels being added. Frame memory 11 is composed of a present frame memory 11A for storing image data of a present frame and a preceding frame memory 11B that stores image data of the frame immediately preceding the present frame. A motion detector 12 detects a motion vector that expresses the motion of the present frame with respect to the preceding frame. Such inter-frame motion is detected by a finer amount in the vertical direction than the size of a pixel (or pixel to pixel spacing) within the distorted image. For the present discussion, it is assumed that the image of an entire frame moves together, such that motion from the preceding frame to the current frame is the same for all portions of the each frame. For this case, only one motion vector is detected by detector 12 for each frame. The motion vector is provided to controller 14.

One method of determining the motion vector is to perform several comparisons between pixel blocks of identical sizes in adjacent frames, e.g., 8×8 or 16 ×16 pixel blocks. Starting with a subject block of the present frame, image characteristics of a number of blocks in the preceding frame (reference blocks) are compared to the subject block. When a reference block in the preceding frame is found with the closest image characteristics to the subject block, it can be concluded that that reference block moved to the position of the subject block, and the motion vector can be determined.

Figure 5:
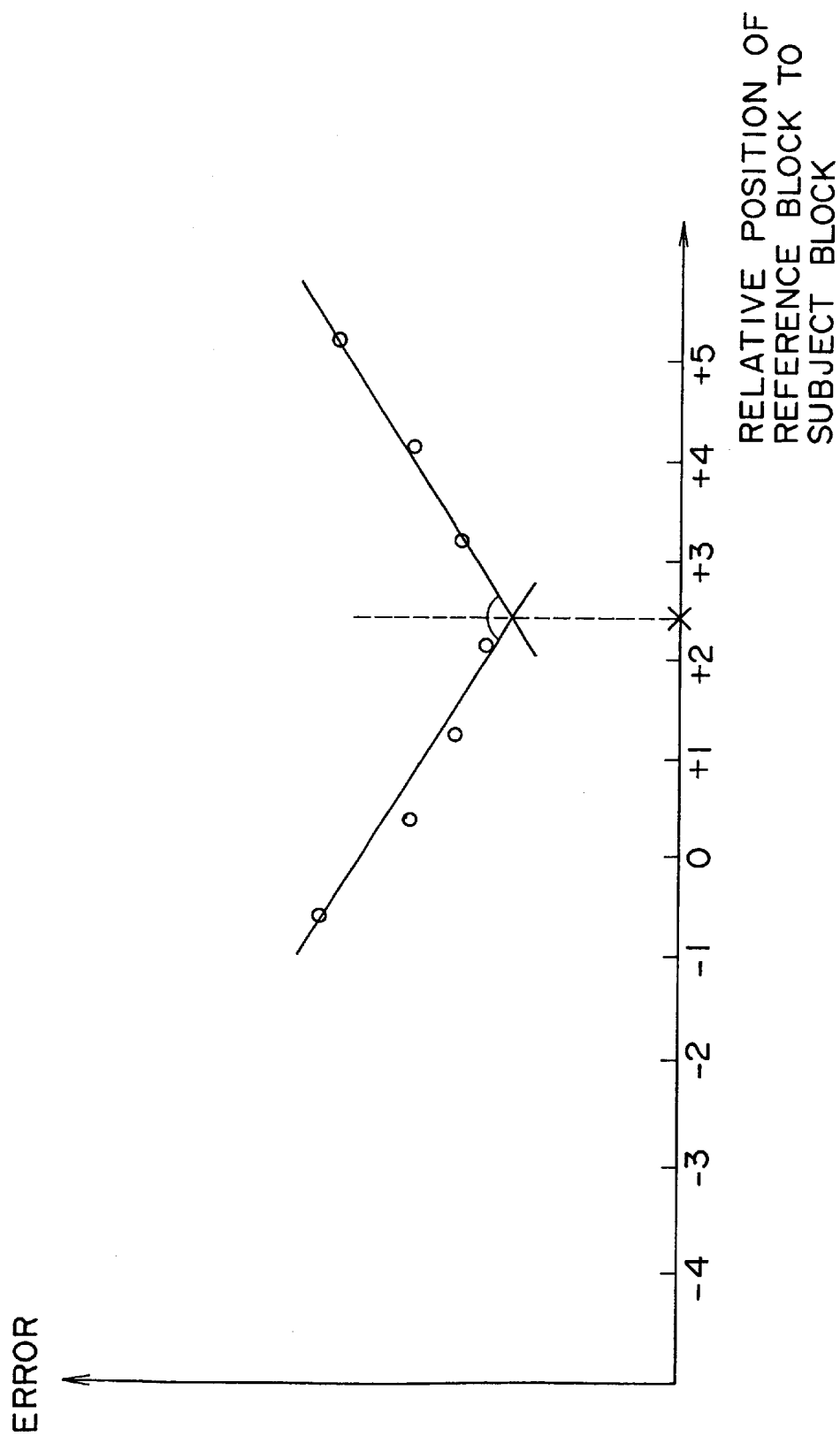
FIG. 5 is a graph illustrating a method of determining a motion vector for an image.

A subject block is compared to a reference block by computing the absolute value difference between pixel values of the pixels in the subject block to corresponding pixels of the reference block. Thus, the signal value of pixel $P_{11}$ (row 1, column 1) in a subject block is subtracted from the signal value of pixel $P_{11}$ in the reference block, and so forth. The difference value is referred to as the error. The errors of each reference block with respect to the subject block are summed, the reference block with the minimum total error is determined, and the motion vector is determined as being approximately in the direction corresponding to the positional relationship between that reference block and the subject block. More specifically, as shown in FIG. 5, a linear interpolation between the reference blocks is performed to more accurately determine the motion vector. The intersection of a pair of linearly interpolated lines of opposite slope defines the relative position in which the minimum error occurs between the subject block and a hypothetical reference block. The intersection defines the motion vector with respect to the subject block.

With continuing reference to FIG. 4, a scene change detector 13 is employed to detect a scene change of the television signal by analyzing differences between images from frame to frame. Generally, if the differences between images of the present frame and the preceding frame exceed a predetermined threshold, a scene change is detected. Methods for detecting scene changes are well known in the art. For instance, scene change detector 13 may be configured to analyze errors between subject blocks and reference blocks in a manner similar to determining a motion vector, and finding the minimum error values for the respective subject blocks forming the present frame. If the total sum of the minimum error values for the respective blocks exceeds a predetermined threshold, a scene change is detected and a scene change signal is provided to controller 14.

Controller 14 controls writing of data from frame memory 11 to a resolution creating memory 15 in accordance with the motion vector supplied from motion detector 12 and the signal from scene change detector 13. Resolution creating memory 15 is capable of storing more image data than the data within one low resolution frame in frame memory 11 so as to store newly created high resolution frames that are sequentially shifted out. Controller 14 controls writing of image data from memory 11 to memory 15 by determining appropriate storage addresses within memory 15 in accordance with the motion vector. High resolution frames are created within memory 15 in a similar manner as was described above in connection with FIG. 2A. Briefly, to create inter-scanning line pixels (resolution-enhancing pixels), data of present frame memory 11A (or from preceding frame memory 11B) is transferred to a high resolution "frame" of memory 15 at the same pixel locations within the frame according to the scanning lines. Image data of the next frame is then written into memory 15 at translated positions according to the motion vector. Controller 14 supplies a relative address pointer to memory 15 to effectuate data transfer to the translated positions, while leaving at least some of the image data of the previous frame stored in memory 15 intact at the same storage locations. Once a frame is created, it is transferred out of memory 15 to vertical low pass filter 16 under the control of controller 14.

It is noted that following a scene change, it would take the time required to receive and process several low resolution frames for a true high resolution frame to be created, as is apparent from FIG. 2A. Thus, when a scene change occurs, interpolation between low resolution image data may be performed to initially create additional pixels in memory 15.

Figure 6:
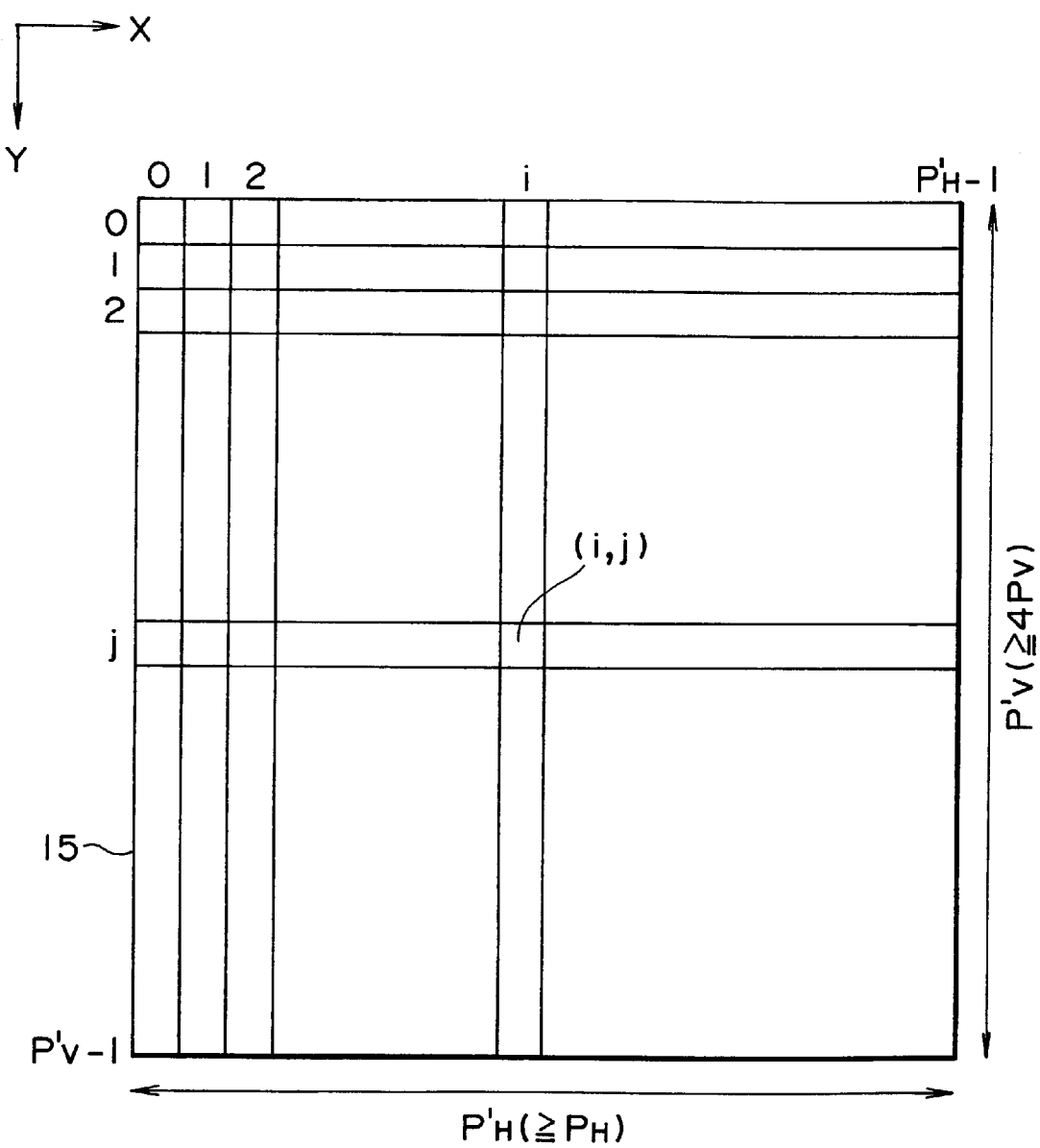
FIGS. 6–8 illustrate data storage within a resolution creating memory.

FIG. 6 illustrates storage of image data within resolution creating memory 15. Memory 15 is capable of storing image data of $P_H'$ pixels in the horizontal (scanning line) direction, and of $P_V'$ pixels in the vertical direction. By way of example, it will be assumed in the following description that $P_H'>P_H$ and $P_V'>4P_V$, where $P_H$ and $P_V$ are the number of pixels in the horizontal and vertical directions, respectively, for low resolution frames stored within frame memory 11. For this case, resolution creating memory 15 is capable of storing a larger number of pixels in the horizontal direction and more than four times the number of pixels in the vertical direction than the low resolution image. As used hereafter, the term "distorted image" or "distorted data" will be used to refer to the image or data as stored within frame memory 11, which data corresponds to an undersampled image in the vertical direction. As explained previously, however, a distorted reproduced image would only result if the data were read out directly from frame memory 11 and reproduced frame by frame. In the present embodiment, the "distorted" image data is used to create a non-distorted, regenerated image.

Within resolution creating memory 15, a data storage location can be defined with an absolute address and also with a relative address. FIG. 6 depicts data storage in accordance with absolute addresses, where the absolute addresses encompass all the storage locations of memory 15. The first row and column of the absolute address storage area are designated as row 0 and column 0. As such, a pixel in the (i+1)st row and (j+1)st column is designated with an absolute address of (i,j).

Figure 7:
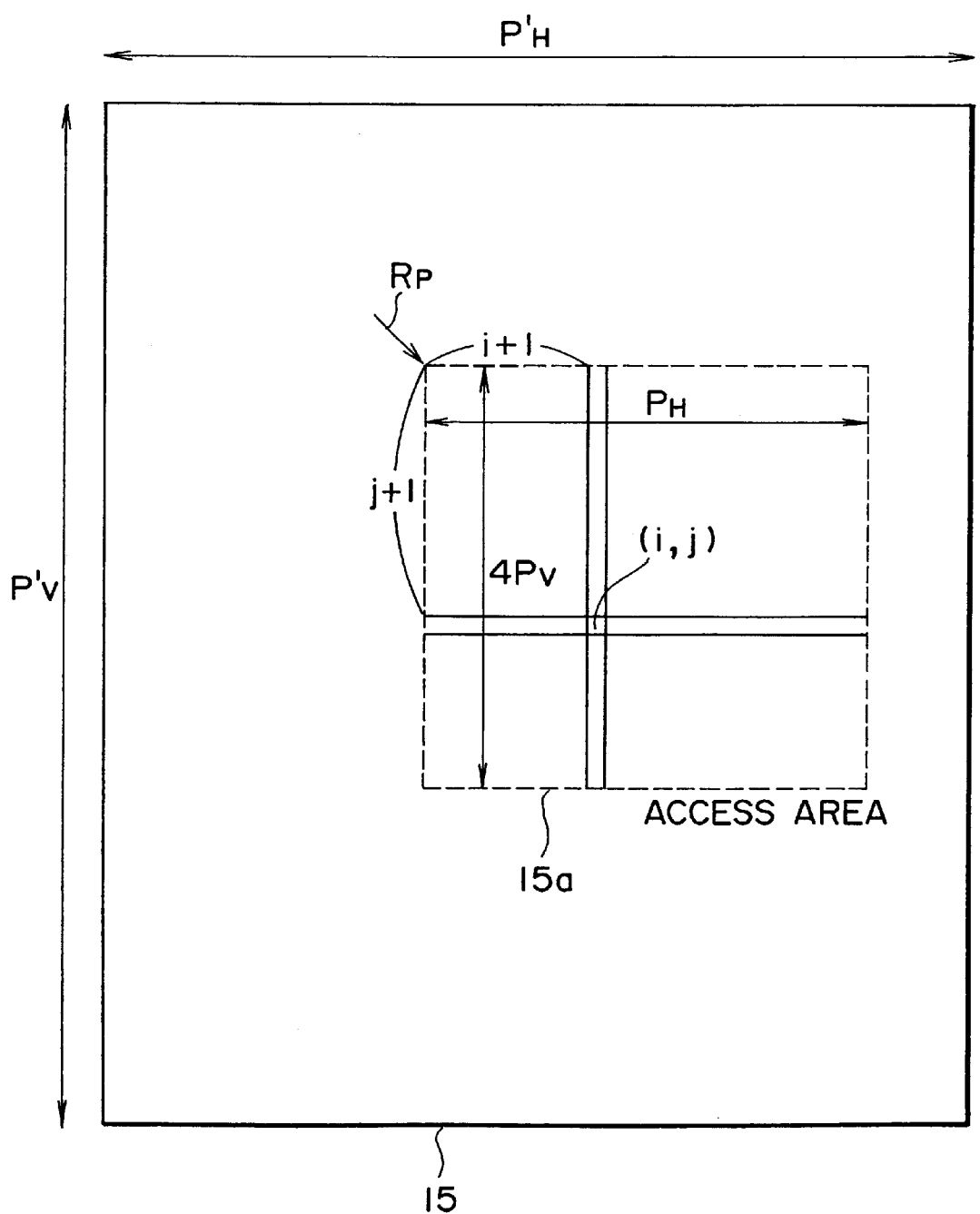

As shown in FIG. 7, within the absolute address storage array of memory 15 there is defined an access area 15a corresponding to $P_H \times 4P_V$ pixels. The location of the upper left point of access area 15a is defined by a relative address pointer $R_P$, designated as an arrow in FIG. 7. Address pointer $R_P$ may actually be a codeword supplied by controller 14 to control circuitry (not shown) within memory 15. The address pointer functions to control where incoming image data is to be written. As is the case for the larger absolute address area, access area 15a also begin with a row 0 and a column 0.

Figure 8:
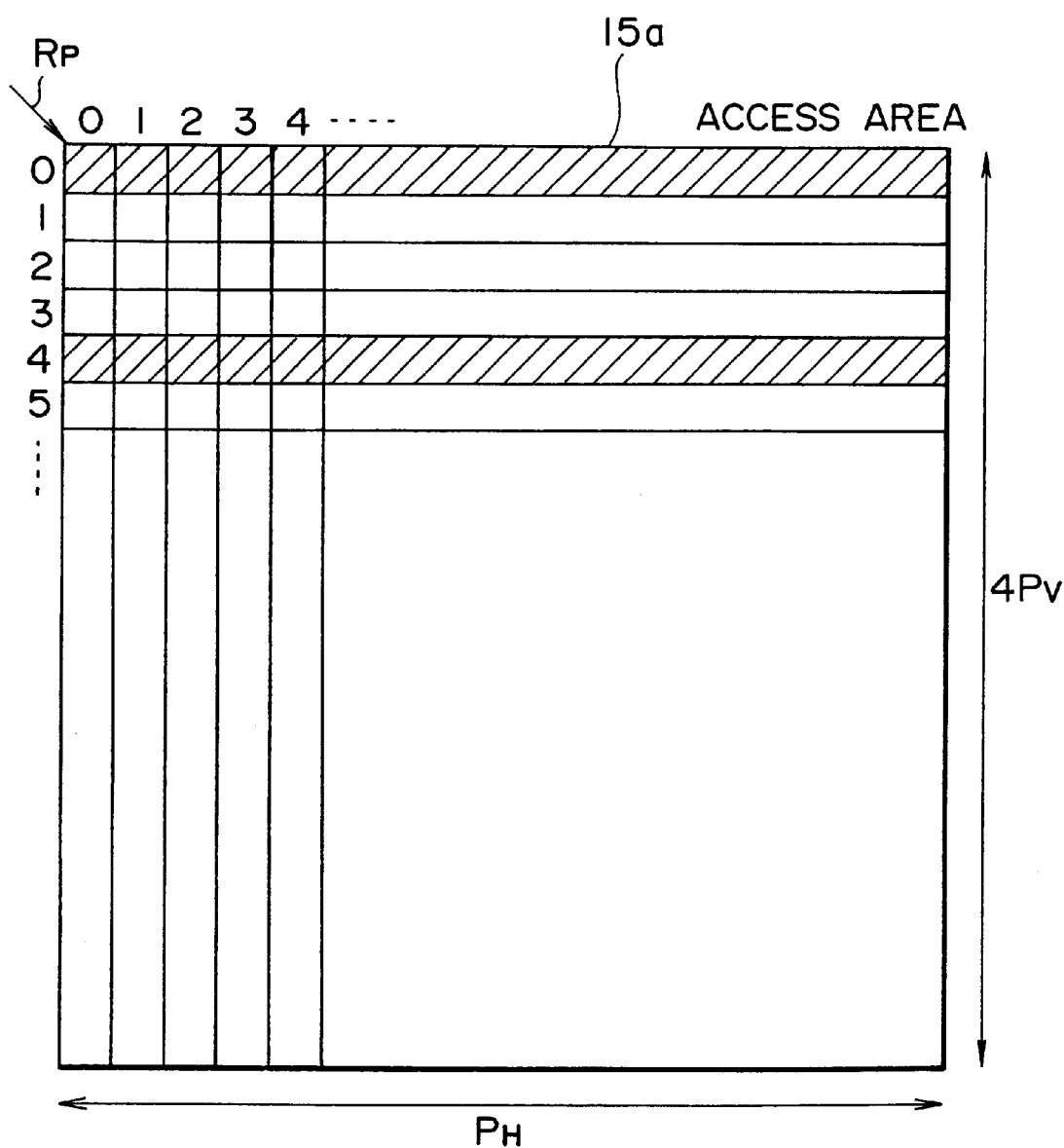

FIG. 8 illustrates how the image data originating from frame memory 11 is written into access area 15a. In the horizontal direction of the access area, image data of the same number of pixels as in a frame of frame memory 11 is stored, whereas in the vertical direction, data of four times as many pixels are stored. Thus, as shown by the shaded area in FIG. 8, the write of a distorted image from frame memory 11 into access area 15a in the horizontal direction is performed sequentially from the address defined by address pointer $R_P$, but in the vertical direction it is performed every fourth line. The pixel data in between the scanning lines, e.g., in rows 1–3, 5–7, etc. in the grid of FIG. 8, are created and stored in accordance with the motion vector to generate a high resolution frame in the vertical direction. To realize higher resolution than that of the distorted image, the motion vector is detected in finer units than the pixel size of the frames in frame memory 11.

The storage of data within resolution creating memory 15 will now be explained in further detail with reference to the flow chart of FIG. 9. When controller 14 receives a signal from scene change detector 13 indicative of a scene change from the preceding frame to the present frame, it resets (clears) all data in memory 15 (step S1). It is noted here that a scene change signal will also be received when the very first frame of data is received by frame memory 11. (Whether the first frame of data is received or a scene change has occurred, the operation by controller 14 is the same.) In step S2, controller 14 causes distorted data of present frame memory 11A to be written into access area 15a every fourth line as shown in FIG. 8. At this point, gaps are present in access area 15a in between the storage locations corresponding to the scan lines, since these storage locations were previously reset. These gaps are filled by means of interpolation performed by controller 14 in step S3. That is, controller 14 computes interpolated values for the inter-scan line pixels and causes those values to be stored as data within access area 15a. The image data including the interpolated values are then read out from memory 15 in step S4 and forwarded to vertical low pass filter 16.

In step S5, the data in present frame memory 11A is shifted to previous frame memory 11B, the next frame of data is received and stored within present frame memory 11A, and it is again determined if a scene change has occurred. If not, motion is detected by motion detector 12 (step S6) and a motion vector is computed. Controller 14 then moves the relative address pointer in accordance with the motion (step S7) and data is written into the high resolution frame within memory 15 in accordance with the motion vector. This operation can be executed in a number of ways. One way would be to transfer out the previous data stored within access area 15a into a temporary buffer memory within controller 14, and then re-write that data back into access area 15a, but shifted in accordance with the motion vector. Following the shift, the data of present frame memory 11A (which has not yet been written into memory 15) would be written into the same access area 15a previously established, i.e., to the same scanning line positions, and every fourth line. As such, some of the previous data would be overwritten. With this approach, the previous high resolution frame data would be shifted each frame in accordance with the motion, as was illustrated previously in FIGS. 2A and 3 where data from each preceding frame was sequentially shifted in direct correspondence with the motion. (One difference, however, is that no interpolated data was assumed in the methods of FIGS. 2A or 3—gaps in the high resolution frame were assumed until the fifth frame in FIG. 2A and until the fourth frame of FIG. 3.)

While the above approach of shifting the storage positions of the high resolution data in direct relation to the motion vector will suffice to create a proper high resolution frame, a preferred approach is to maintain the previous data in access area 15a in the same storage locations, while writing the new low resolution data of present frame memory 11A to shifted locations relative to the previous data within the access area. In other words, the data of frame N+1 will be written into storage locations with different absolute addresses than the data of frame N whenever the motion vector for frame N+1 is non-zero. At the same time, the absolute addresses of the previously data in memory 15 remain the same, so the net effect is a shift of the previous data with respect to the new data. This approach is carried out merely by shifting the relative address pointer in correspondence with the motion vector, but in the opposite direction. Thus, the relative addresses of the low resolution (distorted) data will remain the same (e.g., rows 0, 4, etc. as shown in FIG. 8), but the relative addresses of the preceding high resolution frame data will change in direct relation to the motion vector. In essence, the physical access area 15a of memory 15 will shift with each new relative address pointer.

With each new motion vector, the relative address pointer moves by the same number of pixels as the number of pixels in the horizontal component of the motion vector. In the vertical direction, however, the relative address pointer moves by four times as many high resolution pixels as the number of low resolution pixels in the vertical component of the motion vector (since there are four times as many pixels in the vertical direction of the high resolution frame as in the low resolution frame). Naturally, the relative address pointer is rounded off to the nearest pixel corresponding to the motion vector (or the motion vector is rounded off). Thus, for example, if the vertical component of the motion vector is between $1/8$ and $3/8$ of the size of an original low resolution pixel, then the relative address pointer will move by one vertical unit. (Alternatives to simple round off of the motion vector will be discussed later.)

Figure 9:
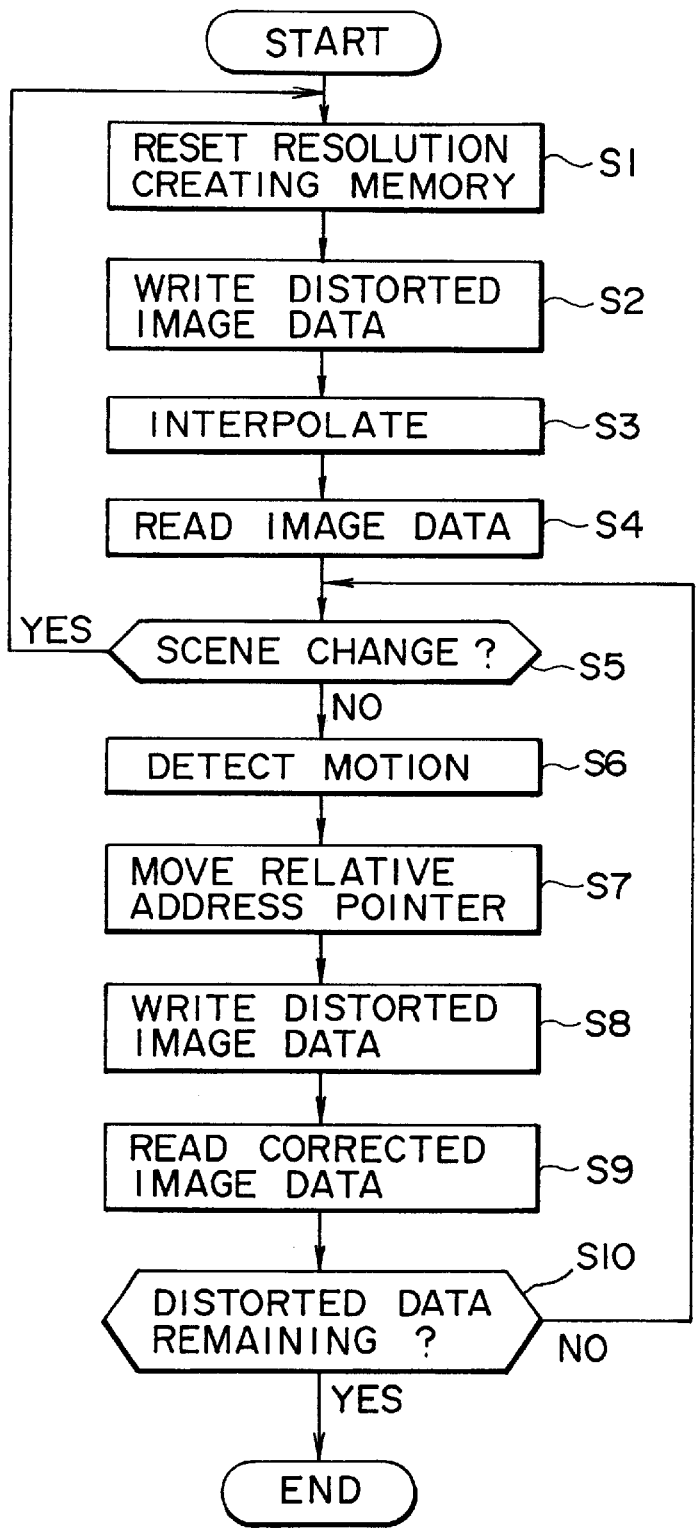
FIG. 9 is a flow chart depicting a routine for creating high resolution frames.

With continuing reference to FIG. 9, the writing of new low resolution (distorted) image data into memory 15 in accordance with the relative address pointer (step S8 ) creates a new high resolution frame, which is then read out to vertical LPF 16 in step S9. If, in step S10 it is determined that low resolution data is no longer being applied to frame memory 11, the routine ends; otherwise, the routine returns to S5 where the process is repeated for each subsequent frame of input image data.

Accordingly, by repeating steps S5 to S9 several times without a scene change, the interpolated data that filled the gaps between the scanning line samples are sequentially replaced by image samples. Several frames after a scene change, the image frames become true high resolution images, and when the highest frequency in the vertical direction contained within the original image is lower than $1/2$ the frequency corresponding to $1/4$ of horizontal scanning period of the distorted image, the reproduced image will have no aliasing distortion in the vertical direction.

Returning to FIG. 4, vertical LPF 16 functions to limit high frequency components in the image data from resolution creating memory 15 by filtering in the vertical direction with a low pass filter. The purpose of such filtering is to prevent aliasing distortion even when the image to be subsequently reproduced is a low resolution image. For example, if only a low resolution display is available, a low resolution image will be displayed, but nevertheless with aliasing distortion removed. Consequently, when the image is subsequently reproduced, the viewer will not perceive an unnatural or blurred moving image. The output signal of vertical LPF 16 is applied to a frame memory 17 which may be have the same storage capacity of access area 15a of memory 15. Frame memory 17 temporarily stores the image data, which is then read out, for example, every fourth line to produce a low resolution image of the same number of lines as the original distorted image but with aliasing distortion removed.

Accordingly, the above-described method improves image quality and renders it possible to prevent drawbacks that accompany certain signal processing operations such as Y/C separation, noise reduction, and so forth.

It will be readily appreciated to those skilled in the art that the above-described technique of creating a high resolution image from an undersampled image in accordance with the motion vector from frame to frame, then filtering the same with a vertical LPF and reading out only a low resolution image, will produce an output image with aliasing distortion removed. On the other hand, if the input low resolution image data were merely applied to a vertical LPF, such aliasing distortion removal would not be realized.

If CRT 6 is capable of displaying a high resolution image by using more horizontal scanning lines than those of the undersampled frames (e.g., four times as many scanning lines), then the image data could be output directly for display. Thus, for this case, vertical LPF 16 would not be utilized, the data would be supplied directly to frame memory 17, and the data would be read out therefrom for display line by line rather than every four lines.

When the highest frequency in the vertical direction contained in the original image is higher than ½ the frequency corresponding to ¼ of a horizontal scanning period, the sampling theorem would not be satisfied with the above approach of generating four times as many pixels, and the aliasing distortion in the vertical direction would not be completely eliminated. Nevertheless, the method would still be useful in that aliasing distortion will be substantially reduced.

While in the above embodiment the number of pixels in the vertical direction are increased by a factor of four, in the alternative, more or fewer inter-scan line pixels may be created, either for the purpose of displaying low resolution or high resolution images with reduced aliasing distortion.

For the above-described distortion corrector 4a, it was assumed that the entire image of any given frame moved together, i.e., in the same direction and by the same distance from frame to frame. In other words, it was assumed that the motion vector for all portions of each frame was the same. That assumption is generally valid for certain applications such as pan and tilt operations. However, in most video applications, different portions of each frame move at different rates and/or in different directions. Embodiments of the present invention to be described below are capable of reducing aliasing distortion while accounting for such independent motion.

Figure 10:
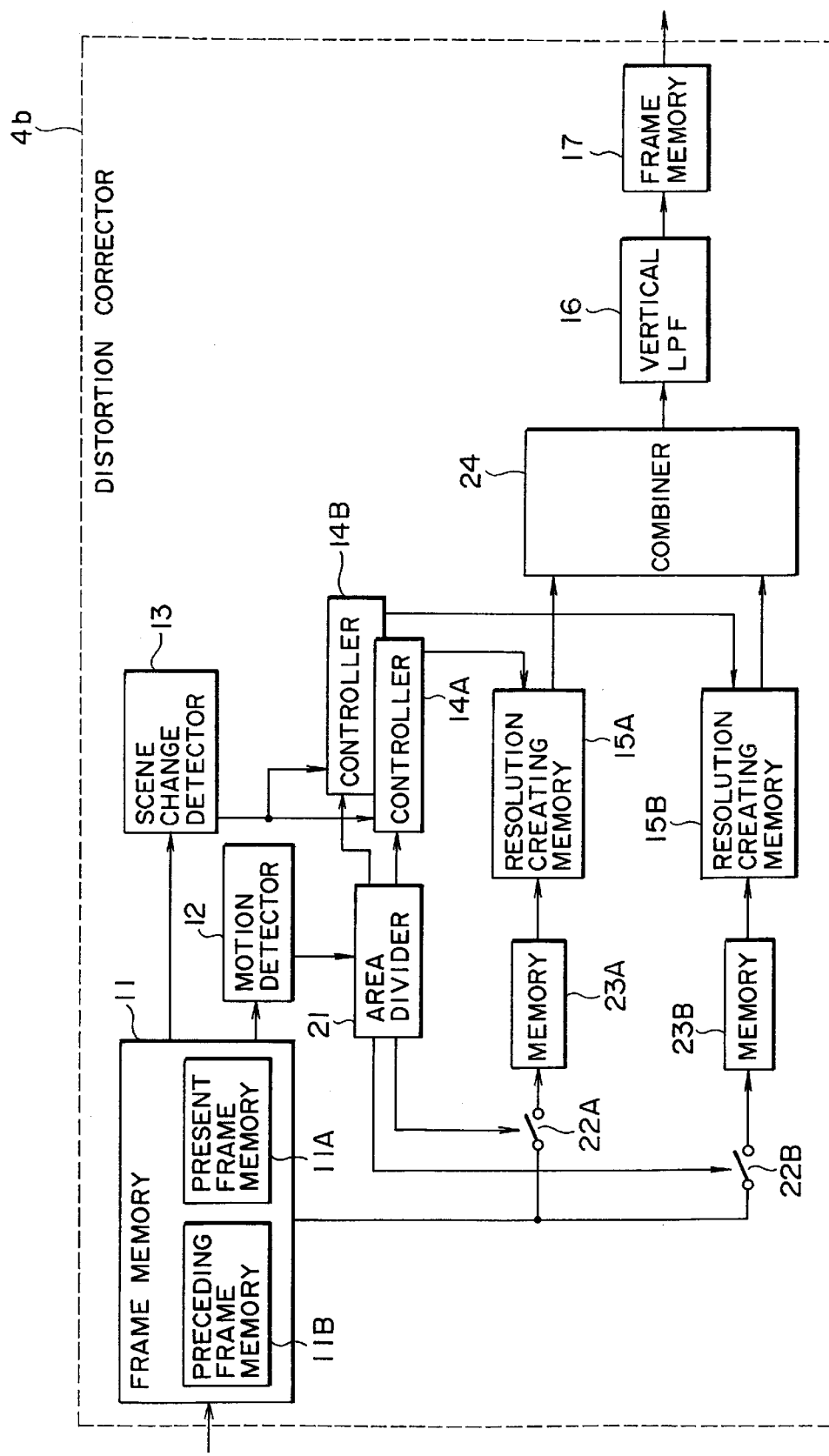
FIG. 10 is block diagram of an illustrative distortion corrector.

Referring now to FIG. 10, a block diagram of another illustrative embodiment of a distortion corrector in accordance with the invention is shown. Distortion corrector 4b has the capability of discerning frame to frame motion for multiple portions of each frame, and generating high resolution frames based on the motion. The high resolution frames may be employed either to generate low or high resolution images, with aliasing distortion removed in either case.

Distortion corrector 4b includes essentially the same frame memory 11, motion detector 12, scene change detector 13, vertical low pass filter 16 and frame memory 17 as was described above for distortion corrector 4a. Motion detector 12 was described above as operative to determine a motion vector of a present frame subject block of, e.g., 8×8 or 16×16 pixels, from the preceding frame by analyzing differences between the subject block and a plurality of reference blocks of the previous frame. In distortion corrector 4a, the motion vector of one subject block was sufficient to determine the motion of the entire frame image. On the other hand, with distortion corrector 4b, a number of motion vectors are determined for each frame, each corresponding to a different subject block. The motion vectors of the various subject blocks are provided to an area divider 21 which divides the frame area into multiple areas for independent processing operations. The areas are defined based on the motion vectors, differences between adjacent pixels, and by means of other necessary operations such as smoothing, etc. By way of example, if a scene includes a fixed or slow moving object such as a background and a fast moving object as an airplane, area divider 21 would define a first area of the frame as corresponding to the background and a second area corresponding to the airplane. In FIG. 10, area divider 21 is adapted to define two areas per frame; however, it is understood that it may alternatively be configured to divide each frame into three or more areas rather than just two areas.

Once area divider 21 defines the image areas for the present frame, it controls the read-out of image data from present frame memory 11A by controlling switches 22A and 22B so that only image data from the first area is directed through switch 22A for temporary storage in a memory 23A, and only data from the second area is directed through switch 22B for storage within memory 23B. Area divider 21 also provides a motion vector for a region within the first area to controller 14A and a motion vector for a region within the second area to controller 14B. Scene change detector 13 supplies scene change signals to controllers 14A and 14B. Controller 14A controls writing of data from memory 23A into resolution creating memory 15A by dynamically changing a relative address pointer based on the motion vector in the first area for each frame. Consequently, inter-scanning line pixels are created in positions according to the motion vector in essentially the same manner as described previously. A high resolution frame or frame portion with, e.g., four times as much resolution in the vertical direction as that in frame memory 11A is thereby created in memory 15A. Likewise, image data of the second frame area is transferred from memory 23B to memory 15B under the control of controller 14B in accordance with the second motion vector to produce a high resolution frame or frame portion in memory 15B. That is, each of controllers 14A and 14B operates in conjunction with memories 15A and 15B, respectively, by dynamically determining respective address pointers in the same manner as discussed above for controller 14 and memory 15 of FIG. 4, except that only a portion of the overall image is enhanced and stored within each memory 15A and 15B.

Data of each high resolution frame created within memories 15A and 15B is transferred to a combiner 24 under the control of controllers 14A and 14B, respectively. Combiner 24 combines the data of the two frame portions to produce image data of a composite frame and provides the same to vertical LPF 16. Thus, the output image data of combiner 24 is similar to that of memory 15 in distortion corrector 4a. Vertical LPF 16 and frame memory 17 perform the same processes as described previously to produce a low resolution image with aliasing distortion removed. Conversely, if a high resolution image is desired, vertical LPF may be bypassed or designed with a different frequency response as discussed earlier.

While distortion correctors 4a and 4b have been described as being operative to create inter-scan line pixels in the vertical direction based on the motion vector (i.e., the motion vector corresponding to both vertical and horizontal motion of the image), image data for additional pixels in the horizontal direction can also be created. That is, high resolution pixels can also be created in memory 15 (or memories 15A, 15B) at positions in between low resolution pixel positions in the horizontal direction in an analogous manner as was described for the vertical direction. As a result, aliasing distortion can further be eliminated in the horizontal direction and higher resolution can be obtained horizontally as well.

A special case exists in which an access area swells out of the storage area of resolution creating memory 15 (or 15A, 15B) in accordance with the position of the relative address pointer. For this case, the data of the swollen out region can be retained by expanding the storage area of the resolution creating memory into a neighboring area. Assuming that $X \geq P_H'$, and $Y \geq P_V'$, when a position expressed by an absolute address (X,Y) is included in the access area, the position is retained at an absolute address of (mod(X, $P_H'$), mod(Y, $P_V'$)) in the storage area of memory 15 (where mod (a, b) expresses the residue when "a" is divided by "b"). Another way of retaining the swollen out data is to relocate the access area including the most recent data retained therein, by controller 14 transferring all the data to a buffer memory and then rewriting it to a new access area using a new address pointer.

In the embodiments discussed above, high resolution frames are created via the assumption of inter-scanning line pixels at positions corresponding to the motion vectors. The high resolution frames are then employed to generate either low or high resolution images with aliasing distortion reduced (or eliminated). Another method of performing such image regeneration is as follows: it is assumed that an original image with no aliasing distortion is designated as P and a distorted (undersampled) image based thereon as P'. The relation between the two is expressed as:

$$P'=f(P) \quad (1)$$

where f( ) denotes a function that subsamples an image in the parentheses.

Likewise, an inverse function of f( ) may be expressed as g( ), so that:

$$P=g(P') \quad (2).$$

Therefore, the regeneration of the original image P from the distorted image P' can be realized theoretically if the function go is found, which renders it possible to reduce aliasing distortion without the necessity of detecting motion of the distorted image.

The function g( ) can be obtained via a learning process in which the original image is considered to contain certain teacher-data and consecutive frames of the distorted image P' are considered to contain learning-data. The inter-scanning line gaps of the distorted image can then be filled based on the function g( ), whereby the original image P can be regenerated.

Aside from removing aliasing distortion, the present invention has other applications such as for producing enlarged images with enhanced resolution, or for converting a low or standard resolution image (hereafter referred to as a SD image) into a high resolution image (hereafter referred to as an HD image).

Figure 11:
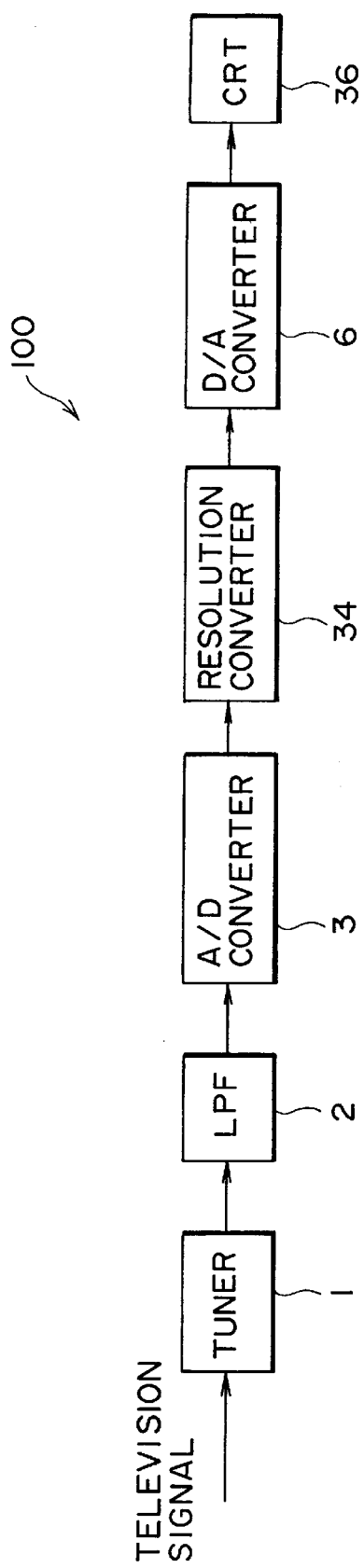
FIG. 11 is a block diagram of another embodiment of a receiver in accordance with the invention.

With reference now to FIG. 11, there is shown a block diagram of an illustrative embodiment of a television receiver 100 that converts a television signal containing an SD image into an HD image for display. Receiver 100 differs from receiver 10 of FIG. 1 by employing a resolution converter 34 in place of distortion corrector 4 and a high resolution CRT 36 in place of CRT 7. The other components are the same as those of receiver 10, with a Y/C converter (not shown) typically employed either between resolution converter 34 and D/A converter 6 or between LPF 2 and A/D converter 3.

Figure 12:
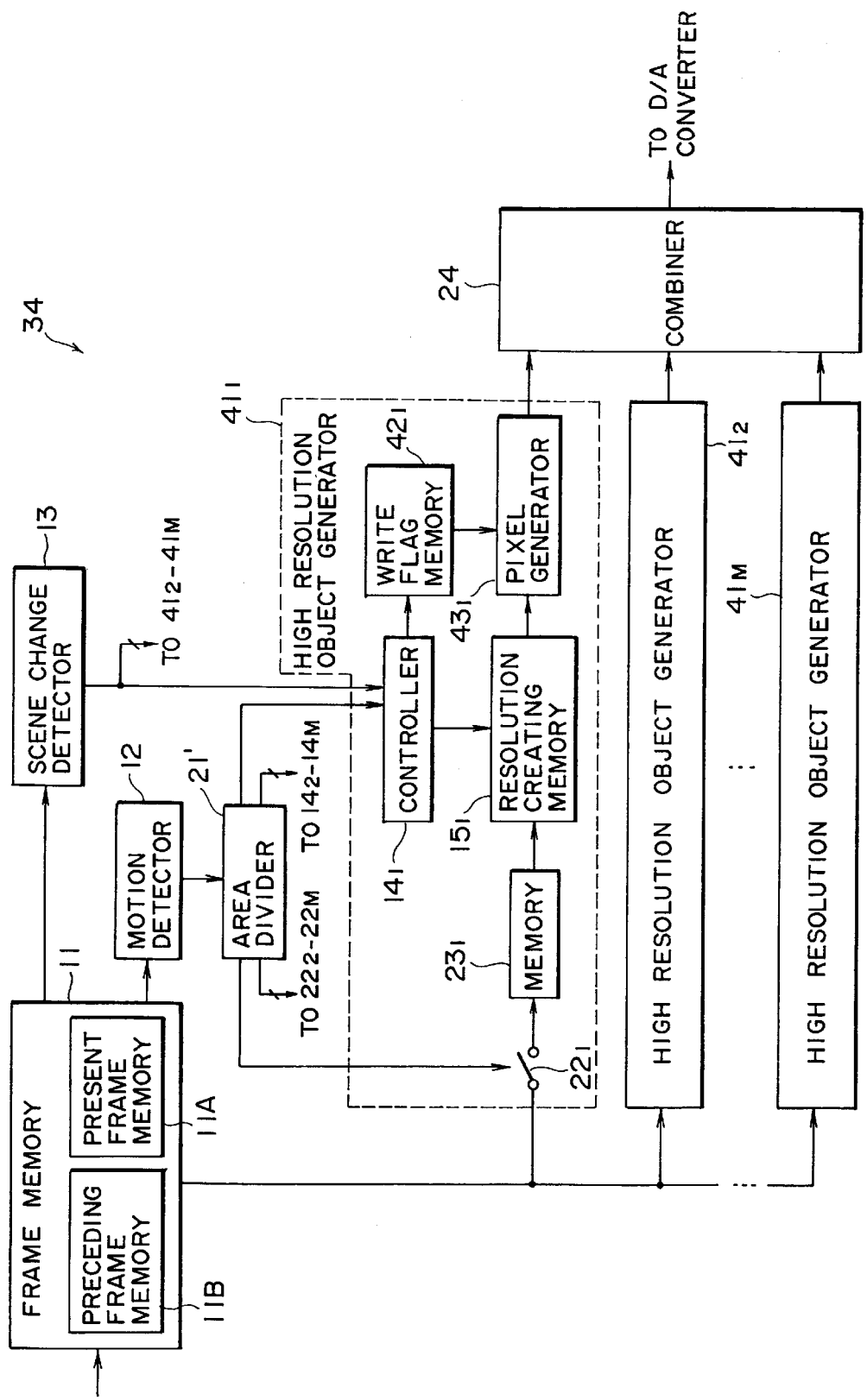
FIG. 12 is a block diagram of an illustrative resolution converter within the receiver of FIG. 11.

FIG. 12 is a block diagram of an embodiment of resolution converter 34. Resolution converter 34 is similar in many respects to distortion corrector 4b of FIG. 10, in that it operates to divide the area of a low resolution frame in accordance with different motion in respective areas, creates a high resolution image for each area and combines the high resolution images for each area to produce a composite image. Resolution converter 34 is configured to enhance resolution in both horizontal and vertical directions by creating pixels in positions between adjacent horizontal pixels and also between adjacent vertical pixels of the SD image based on the motion vectors for each frame. Converter 34 may generate some of the high resolution pixels by a classification and adaptive processing technique to be discussed in detail later.

Resolution converter 34 includes frame memory 11, motion detector 12 and scene change detector 13 as described previously, as well as area divider 21' which is the same as area divider 21 of FIG. 10 except that divider 21' divides each frame into M frame areas rather than just two areas. Each one of M high resolution object generators functions to generate a high resolution object for a respective one of the frame areas defined by area divider 21'. Each object generator 41$i$ (i=1, 2, . . . M) includes switch 22$i$, buffer memory 23$i$, controller 14$i$, resolution creating memory 15$i$, write flag memory 42$i$ and pixel generator 43$i$.

Each write flag memory 42$i$ stores the same number of write flags as the number of pixels stored in associated resolution creating memory 15$i$. The write flag is a one bit flag designating whether pixel data of an SD image is stored in a corresponding address of memory 15$i$ (e.g., the flag is a 1 if pixel data is stored in the address and 0 if it is not). The write flag is controlled by controller 14$i$ to be set/reset.

Figure 13:
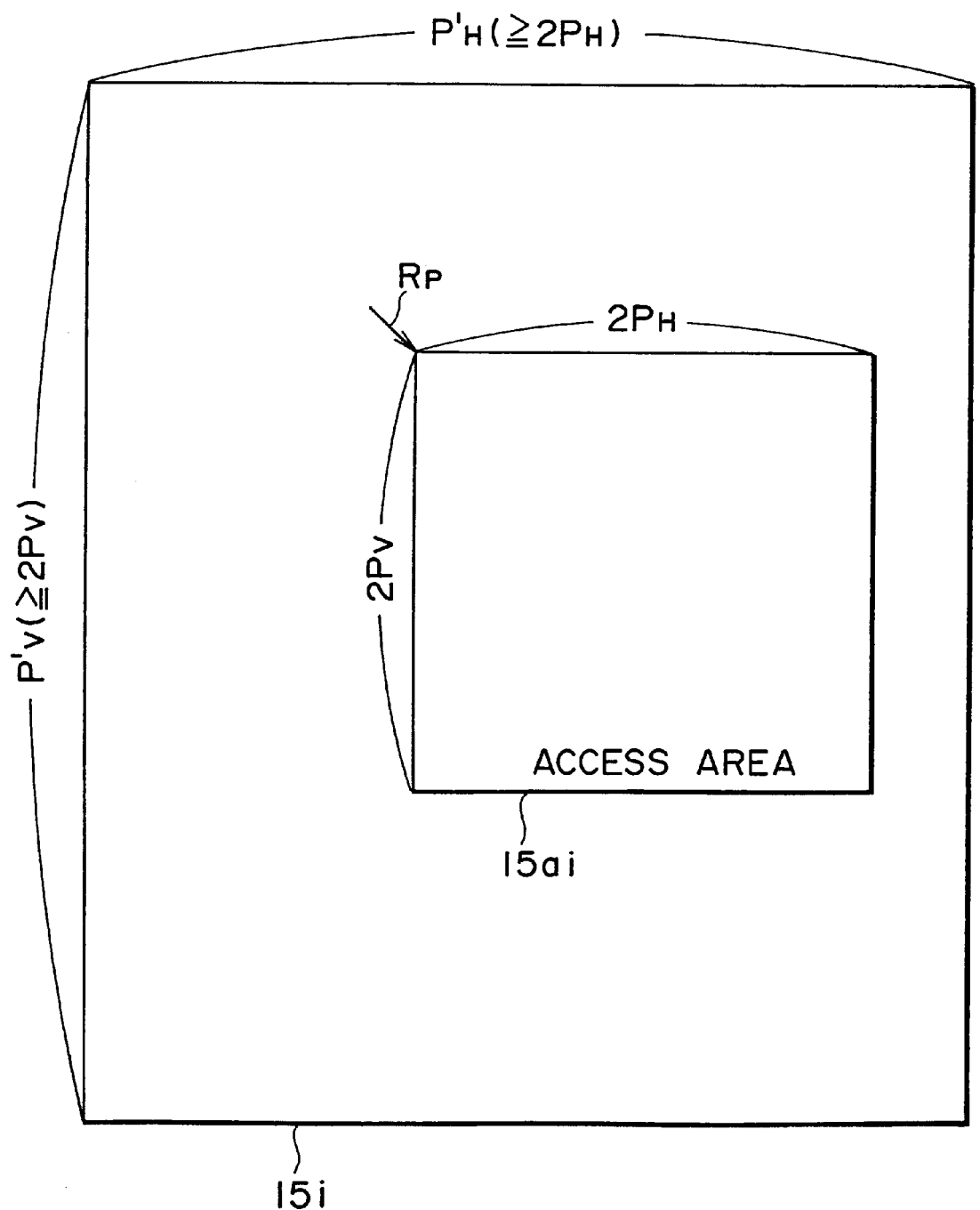
FIG. 13 depicts data storage locations of a resolution creating memory of the converter of FIG. 12.

Referring to FIG. 13, each resolution creating memory 15$i$ is designed with a storage area capable of storing pixel data of $P_H'$ pixels in the horizontal direction and $P_V'$ pixels in the vertical direction, with $P_H' \geq 2P_H$ and $P_V' \geq 2P_V$, where $P_H$ and $P_V$ are the number of pixels in the horizontal and vertical directions, respectively, of an SD frame stored within frame memory 11. In this example, memory 15$i$ is capable of storing pixel data of more than twice as many pixels in the vertical direction and more than twice as many pixels in the horizontal direction as the SD image. Memory access area 15$ai$ is comprised of storage locations to store pixel data of $2P_H \times 2P_V$ pixels.

Figure 14:
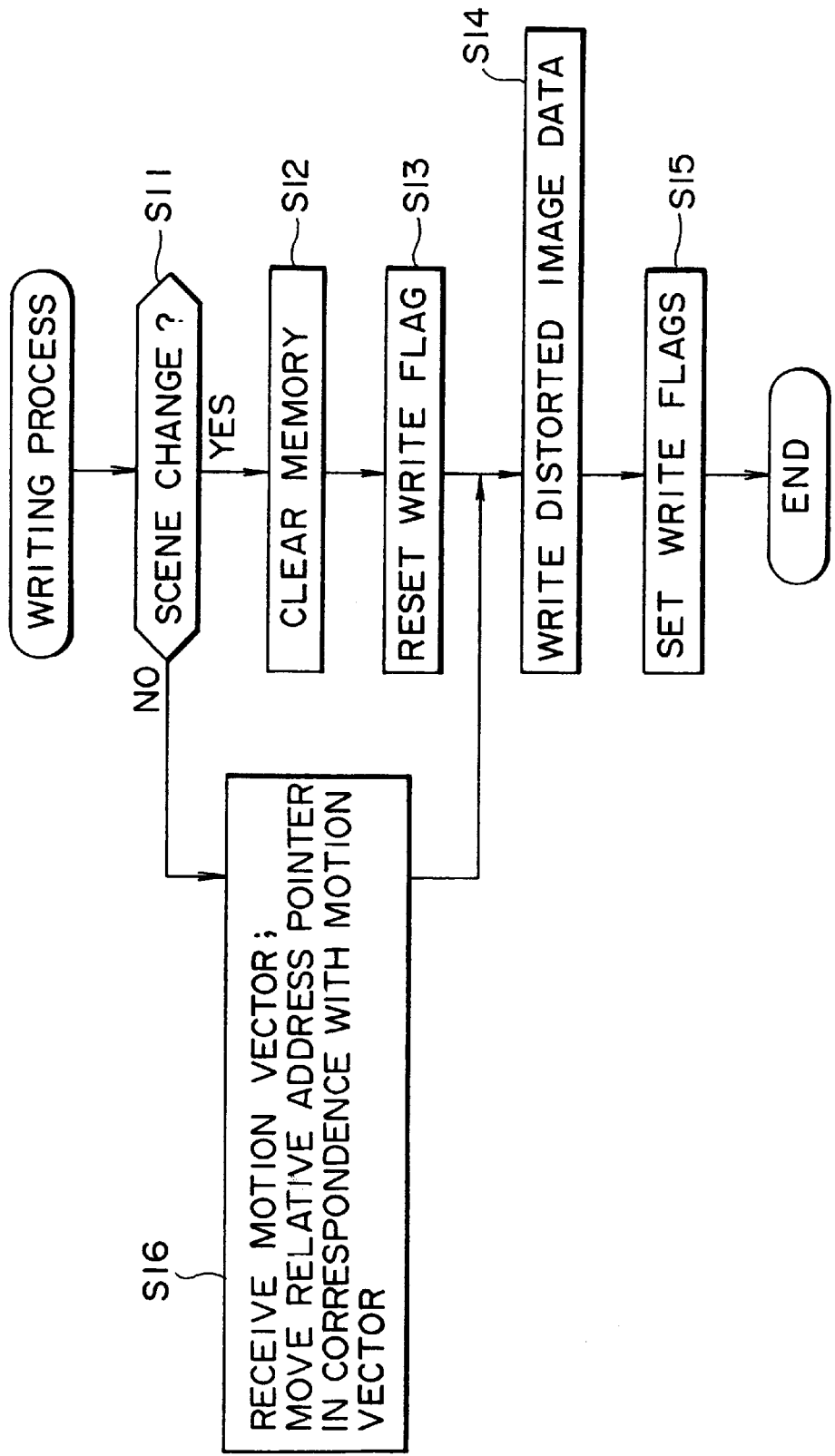
FIG. 14 is a flow diagram depicting a routine for writing image data within a memory of the resolution converter.

A procedure for writing a frame of SD data into resolution creating memory 15$i$ will now be described with reference to the flow chart of FIG. 14. In step S11, if scene change detector 13 detects either a scene change or the reception of the first frame of data, a scene change signal is provided to each of controllers $14_1$–$14_M$. Each controller 14$i$ then clears the associated memory 15$i$ in step S12 (erasing previous frame pixel data) and resets all write flags in write flag memory 41$i$ to an initial value (step S13). Distorted SD image data of the associated frame area of present frame memory 11A is then written into memory 15$i$ (step S14) by closing switch 22$i$ at appropriate times in a frame data readout operation from frame memory 11A. Thus, only the image data within the associated area as defined by area divider 21' is transferred through switch 22$i$ and memory 23$i$. In particular, SD data is written into the access area of memory 15$i$ at every other pixel position in both horizontal and vertical directions. Thus, for example, it is assumed that SD frames are arranged with M pixel rows (rows 1 to M) by N pixel columns (columns 1 to N), and the access area of memory 15$i$ is a storage array corresponding to 2M rows (rows 1 to 2M) by 2N columns (columns 1 to 2N). Then, if data of pixel 1,1 corresponding to row 1, column 1 of the SD frame is transferred to object generator 41$i$, it will be initially stored in the storage location of the access area corresponding to the HD pixel of row 2, column 2 of the access area. Preferably, that storage location will also be row 2, column 2 in the storage array, to facilitate pixel creation. Similarly, SD data of pixel 2,2 of the SD frame will be initially stored in row 4, column 4 of the access area, and so forth. Write flags are concurrently set for each of the HD storage locations in which SD data is thus stored. The image data is read out from memory 15$i$ by pixel generator 43$i$ at this point, but is not erased from memory 15$i$ because it will be used to form part of the next high resolution frame (in the absence of a scene change).

If, in step S11, no scene change signal is received, then in step S16, each controller 14*i* receives the motion vector from area divider 21' corresponding to the motion in the associated image area of the present frame. Controller 14*i* computes a new relative address pointer $R_p$ corresponding to the motion vector and supplies the same to resolution converting memory 15*i*. The routine then proceeds to step S14 where the distorted image data of the present frame is written into memory 15*i* in accordance with the relative address pointer just determined, whereby data previously stored in the preceding frame of memory 15*i* is shifted with respect to the new data (since the data of the previous frame remained stored at the same locations in accordance with previous address pointers while data of the present frame is stored in accordance with the new address pointer). As explained previously, some of the previously stored data is typically overwritten in this step. Write flags are then set for the storage locations in which new data is stored in step S15 (unless they were already set previously).

Accordingly, as the write process proceeds frame by frame in each resolution creating memory 15*i*, an HD image having twice as much resolution as the corresponding SD image in both horizontal and vertical directions gradually approaches to completion.

Figure 15:
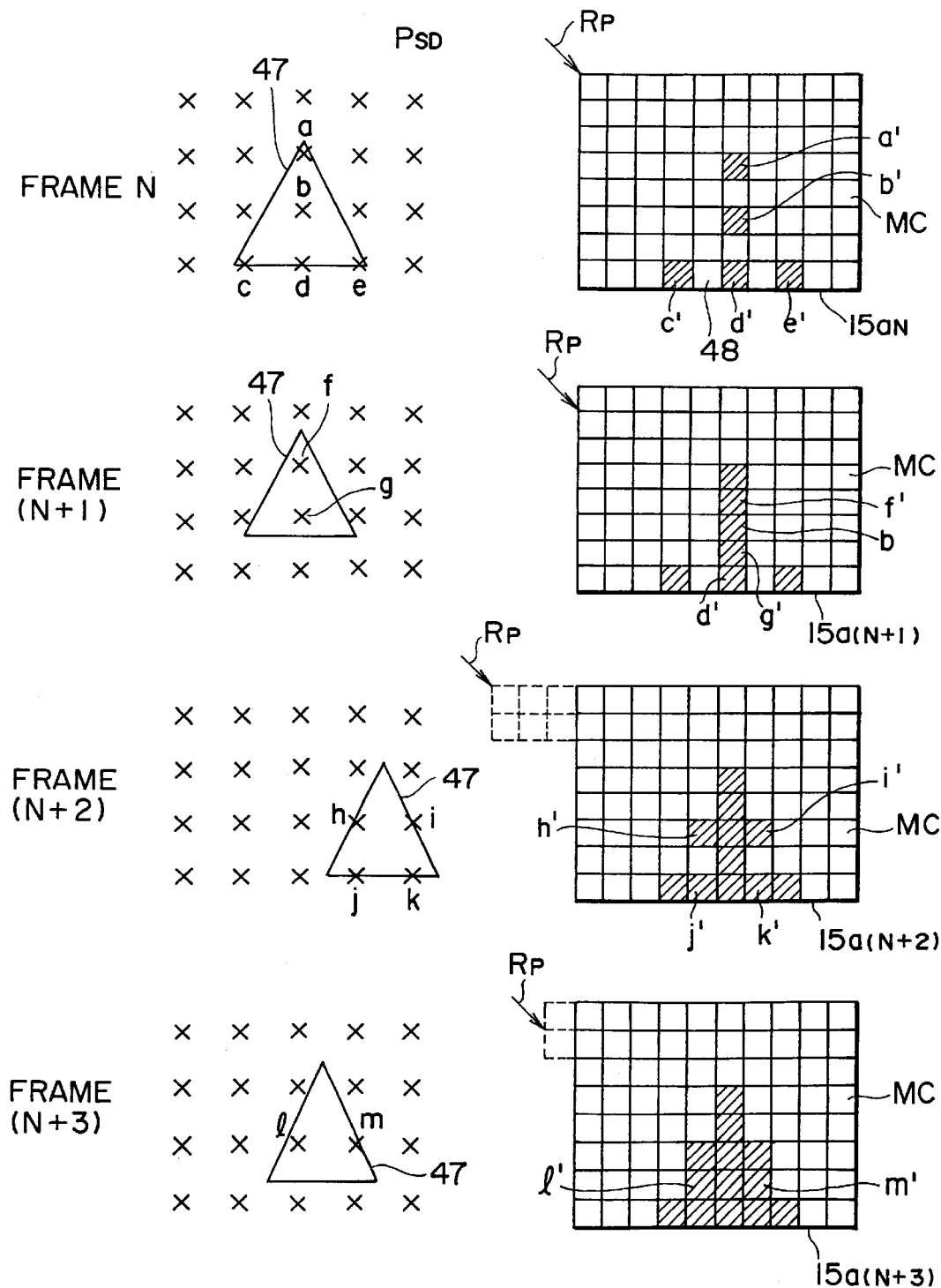
FIG. 15 illustrates storage of image data in the resolution converter in accordance with a motion vector of an image.

To further illustrate the creation of an HD image, reference is made to FIG. 15 which illustrates inter-frame movement of a small, solid triangular object 47 and associated storage of pixel data representing the same. The left hand side of the figure shows an array of SD pixels $P_{SD}$ superimposed with object 47 while the right hand side depicts storage locations MC within access areas $15a_N$ to $15a_{(N+3)}$ for frames N to (N+3), respectively. In the low resolution image, SD pixels $P_{SD}$ within the bounded region of object 47 represent the object by, e.g., having more or less luminance and/or being of a different color than the neighboring pixels. In any event, object 47 is assumed to be represented by pixels a, b, c and d in frame N, by pixels f, g in frame (N+1), pixels h, i, j, k in frame (N+2) and by pixels 1, m in frame (N+3), where the pixels change from frame to frame due to the inter-frame motion.

In accordance with the above-described method, SD pixel data is written into access areas $15a_N$ to $15a_{(N+3)}$ in the shaded regions in alternating storage locations. In frame N, storage locations (a' to e') are filled with pixel data corresponding to SD pixels (a to e). Between frames N and N+1, the object moved upwards by ½ the SD pixel spacing (spacing between midpoints of adjacent SD pixels) so that relative address pointer $R_p$ of frame N+1 moves down by one HD pixel storage location as shown, and the pixel data for pixels f and g are written. Meanwhile, the absolute storage locations storing pixel data (a'–e') remain the same in frame N+1. Thus, it is seen that while pixels b and g are at the same location in the SD image, the corresonding "pixels" b' and g' are shifted with respect to one another in access area $15a_{(N+1)}$ representing the HD image. The process continues with address pointer $R_p$ moving from its previous position in the opposite direction as the object motion, until a complete HD image is formed in frame (N+3). Note that it would take more frames to generate a complete HD image based solely on generating HD pixel data in accordance with the motion vector if the object were to remain still or if the motion is slight from frame to frame.

Figure 16:
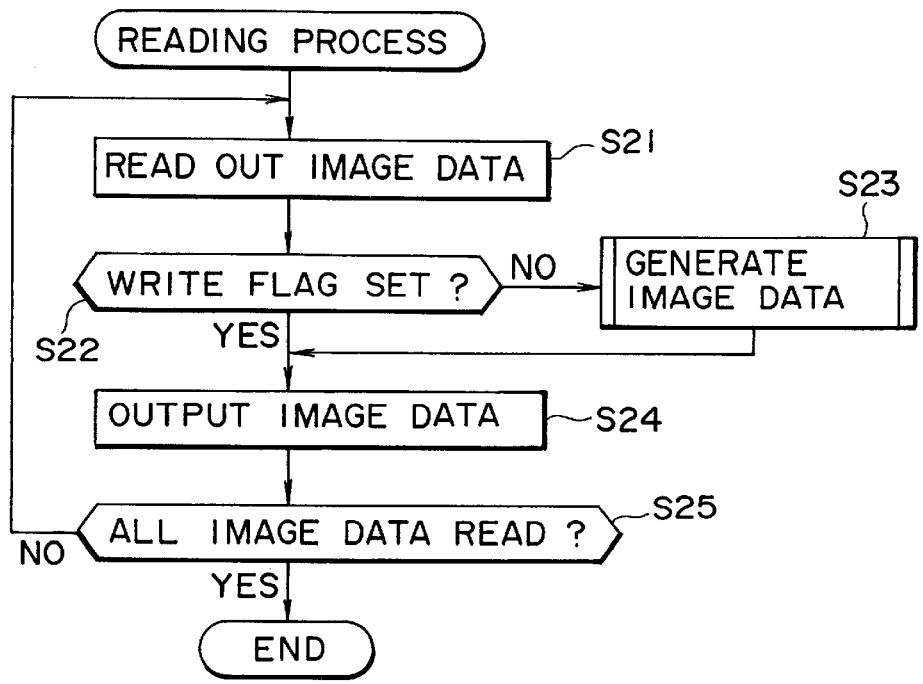
FIG. 16 is a flow diagram illustrating a routine for reading image data from a resolution converting memory within the resolution converter.

FIG. 16 is a flow chart illustrating a routine for reading image data from high resolution object generator 41*i*. The reading routine follows the routine of FIG. 14 each time new image data is written into memory 15*i*, i.e., each time writing of data for a particular frame is completed. In step S21, controller 14*i* reads image data from storage locations of access area 15*i* and supplies the data to pixel generator 23. In step S22, pixel generator 23 determines, based on the write flags in write flag memory 42*i*, whether or not image data is stored for a particular high resolution pixel corresponding to a particular address. For instance, considering FIG. 15, assuming that frame N corresponds to the first frame after a scene change, the storage locations c' and d' contain stored image data but the storage location 48 in between c' and d' is empty. As such, the write flag for c' and d' would be set to 1 whereas that for storage location 48 is at 0. Thus, prior to displaying the image data for a current frame such as frame N, pixel data needs to be created for HD pixels corresponding to the empty storage locations as 48.

Therefore, in step S23, image data is generated by pixel generator 43*i* if the storage location under consideration is empty as indicated by the associated write flag. The image data may be generated in various ways, such as by interpolating between neighboring pixels or by a more complex prediction technique such as a classification and adaptive processing method to be described below. In any case, once the image data is created for the pixel under consideration (or read directly from memory 15*i* if already stored therein), the pixel data for that pixel is outputted from object generator 41*i* in step S24 and supplied to combiner 24. If all image data of the high resolution frame under consideration is determined to have been read in step S25, the reading process for that frame is complete. Otherwise, the routine returns to step S21 to read data from the next storage location and to once again create pixel data if necessary.

Figure 17:
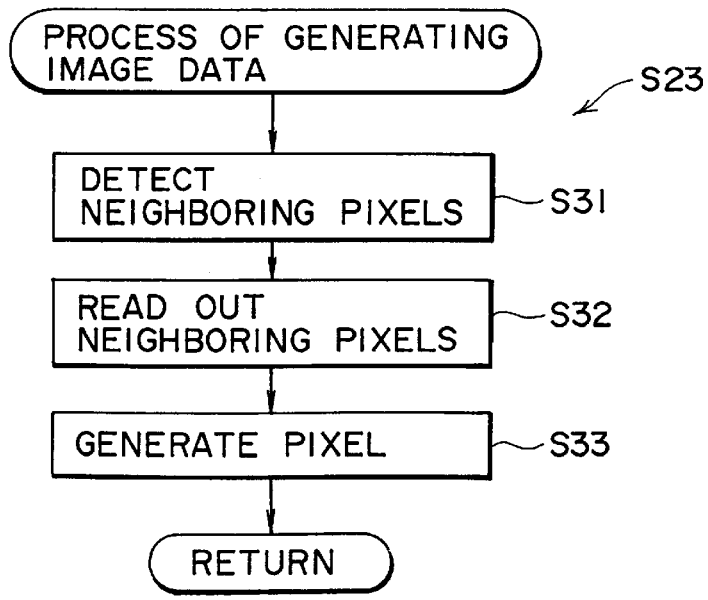
FIG. 17 is a flow diagram depicting a process for generating high definition pixel data.

FIG. 17 illustrates a simplified flow chart for the process step 23 of generating image data for pixels corresponding to empty storage locations, whether by interpolation or by a prediction technique. In step S31, it is determined based on the write flags, which neighboring pixels to the pixel under consideration contain stored pixel data within memory 15*i*. Then, in step S32, data is read from the storage locations in access area 15*ai* corresponding to those neighboring pixels. Pixel data for the pixel under consideration is then generated in step S33 based on the neighboring pixel data.

GENERATING PIXEL DATA BY AN ADAPTIVE PROCESS

If a high resolution frame in resolution creating memory 15*i* has empty storage locations as described above, a simple interpolation technique to generate pixel data for the empty storage locations may be insufficient to recapture high frequency components of the original image. The present applicant has previously proposed an image converter device which converts an SD image into an HD image containing a high frequency component that was not contained in the SD image. See U.S. Pat. No. 5,517,588 entitled DIGITAL DATA CONVERSION EQUIPMENT AND A METHOD FOR THE SAME, which issued on May 14, 1996. Accordingly, the same or similar adaptive process can be used by pixel generator 43*i* to generate pixel data for the empty storage locations. That is, the adaptive process can be employed to create "fill-in" pixels in addition to those created by means of assuming pixels at locations corresponding to the detected image motion. An illustrative adaptive process to implement such pixel creation will now be described.

The adaptive process determines a predicted value of a pixel of an HD image based on linear coupling between an SD image and a predetermined estimation coefficient. For example, a predicted value E[y] of a pixel value y of an HD pixel to form an HD image can be determined by utilizing a linear combination model. This model is defined by a linear combination of pixel values of SD pixels (hereinafter referred to as learning data), $x_1, x_2, \ldots$, and predetermined prediction coefficients, $w_1, w_2, \ldots$. For this case, the predicted value E[y] is expressed as follows:

$$E[y] = w_1 x_1 + w_2 x_2 + \quad (3)$$

To generalize the above, a matrix Y' is assumed to be composed of a set of the predicted values E[y], for $y = Y_1$ to $Y_n$. That is, matrix Y' is defined as the product of a matrix W, which is a set of prediction coefficients w, and a matrix X, which is a set of learning data. An observation equation is thus obtained as follows:

$$XW = Y' \quad (4)$$

where, $$X = \begin{pmatrix} X_{11} & X_{12} & \cdots & X_{1n} \\ X_{21} & X_{22} & \cdots & X_{2n} \\ \vdots & \vdots & \vdots & \vdots \\ X_{m1} & X_{m2} & \cdots & X_{mn} \end{pmatrix}, W = \begin{pmatrix} W_1 \\ W_2 \\ \vdots \\ W_n \end{pmatrix}, Y' = \begin{pmatrix} E[y_1] \\ E[y_2] \\ \vdots \\ E[y_n] \end{pmatrix}.$$

One method of finding a predicted value E[y] that is close to an HD pixel value y entails applying the least square method to the observation equation (4). For this case, matrix Y' is considered as the sum of a matrix Y and a matrix E, where matrix Y is composed of a set of real HD pixel values (to be used as teacher data) and matrix E is composed of a set of residual "e" of the predicted values E[y]. Thus, the following residual equation is derived from equation (4):

$$XW = Y + E$$

where, $$E = \begin{pmatrix} e_1 \\ e_2 \\ \vdots \\ e_m \end{pmatrix}, Y = \begin{pmatrix} y_1 \\ y_2 \\ \vdots \\ y_n \end{pmatrix}. \quad (5)$$

The square root error is defined as the sum of the squares of the residuals, that is, $$\sum_{i=1}^{m} e_i^2 \quad (6)$$

Thus, the prediction coefficient $w_i$ for obtaining a predicted value E[y] close to an HD pixel value can be found by minimizing the square root error of equation (6).

When the square root error is differentiated by the prediction coefficient $w_i$, if the result is 0, the value for $w_i$ which satisfies the following equation (7) is the optimum value for finding a predicted value E[y] close to the HD pixel value:

$$e_1 \frac{\partial e_1}{\partial w_i} + e_2 \frac{\partial e_2}{\partial w_i} + \cdots + e_m \frac{\partial e_m}{\partial w_i} = 0 \quad (7)$$

$$(i = 1, 2, \ldots, n)$$

When equation (6) is differentiated by the prediction coefficient $w_i$, the following equation (8) is obtained:

$$\frac{\partial e_1}{\partial w_i} = X_{i1}, \frac{\partial e_1}{\partial w_2} = X_{i2}, \ldots, \frac{\partial e_i}{\partial w_n} = X_{in}, \quad (8)$$

$$(i = 1, 2, \ldots, m)$$

From equations (7) and (8), the following equation (9) is derived:

$$\sum_{i=1}^{m} e_i x_{i1} = 0, \sum_{i=1}^{m} e_i x_{i2} = 0, \cdots \sum_{i=1}^{m} e_i x_{in} = 0 \quad (9)$$

When the relations among the learning data x, prediction coefficients w, teacher data y and residuals e are considered, a set of prediction equations (10) can be obtained as follows:

$$\left(\sum_{i=1}^{m} x_{i1} x_{i1}\right) w_1 + \left(\sum_{i=1}^{m} x_{i1} x_{i2}\right) w_2 + \cdots + \left(\sum_{i=1}^{m} x_{i1} x_{in}\right) w_n = \left(\sum_{i=1}^{m} x_{i1} y_i\right) \quad (10)$$

$$\left(\sum_{i=1}^{m} x_{i2} x_{i1}\right) w_1 + \left(\sum_{i=1}^{m} x_{i2} x_{i2}\right) w_2 + \cdots + \left(\sum_{i=1}^{m} x_{i2} x_{in}\right) w_n = \left(\sum_{i=1}^{m} x_{i2} y_i\right)$$

$$\vdots$$

$$\left(\sum_{i=1}^{m} x_{in} x_{i1}\right) w_1 + \left(\sum_{i=1}^{m} x_{in} x_{i2}\right) w_2 + \cdots + \left(\sum_{i=1}^{m} x_{in} x_{in}\right) w_n = \left(\sum_{i=1}^{m} x_{in} y_i\right)$$

The number of equations in equation set (10) correspond to the number of prediction coefficients w. The optimum prediction coefficients w can be obtained by solving eqns. (10), which can be solved by a conventional technique, for example, by utilizing Gauss-Jordan's erasing method. It is noted that for eqns. (10) to be solvable, a matrix composed of the prediction coefficients w should be a regular matrix.

Accordingly, with the above-described adaptive process, optimum prediction coefficients w are obtained for the purpose of deriving an optimum predicted value E[y] that is close to an HD pixel value (i.e., close to an HD pixel value which would exist if an HD signal was originally received by the television receiver rather than an SD signal). The adaptive process is different from an interpolation process in that a high frequency component of an original image, absent from an SD image but contained in an HD image, can be restored. The adaptive process, as far as only equation (1) is concerned, is similar to an interpolation process that uses an interpolation filter. For the adaptive process, however, the prediction coefficient corresponding to a tap coefficient of the interpolation filter can be obtained by learning using teacher data. Consequently, the high frequency component contained in the HD image can be restored to readily obtain a high resolution image.

Figure 18:
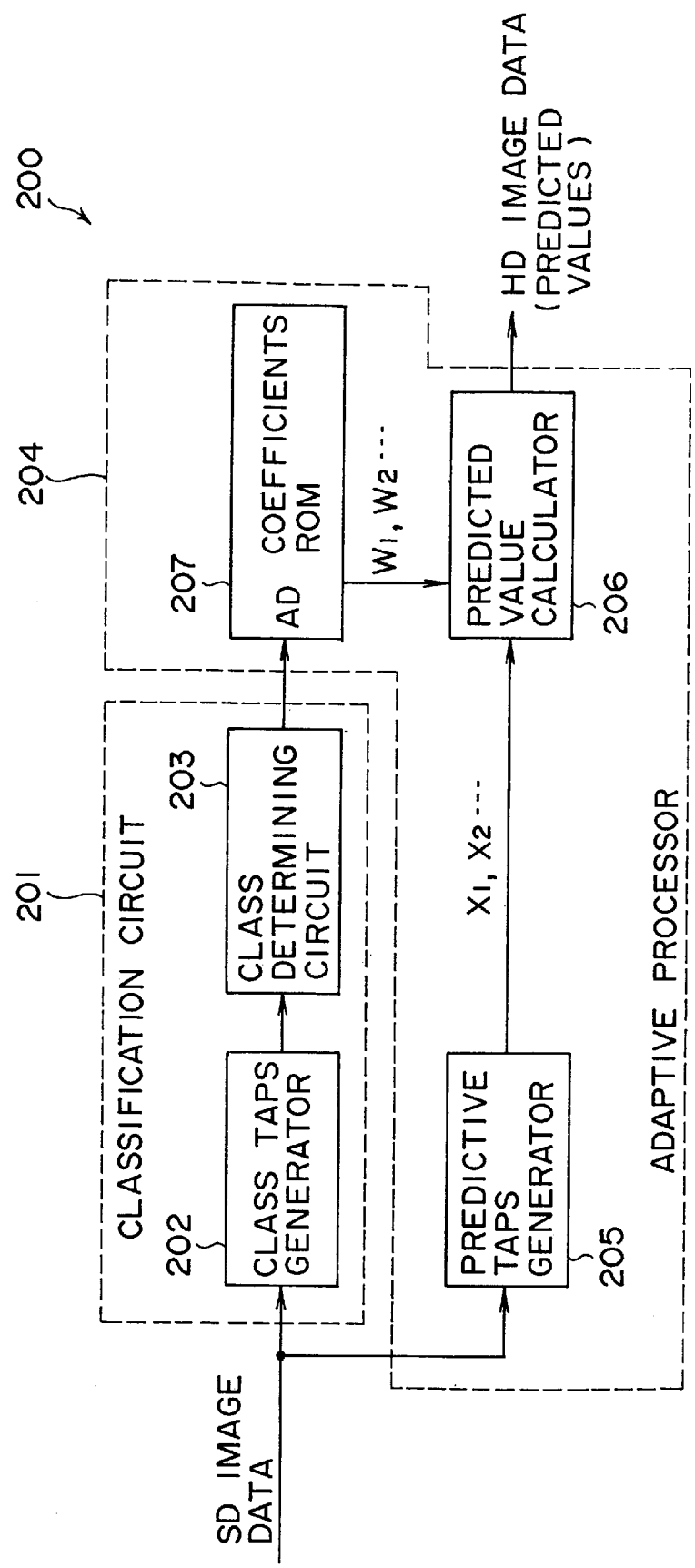
FIG. 18 is a block diagram of a circuit for generating high definition image data from standard definition image data employing prediction coefficients.

Turning now to FIG. 18, a block diagram of an image converter device 200 for converting an SD image to an HD image is shown. Device 200 may be used as part of pixel generator 43i to generate HD pixel data when necessary, i.e., whenever an HD pixel storage location in the resolution creating memory is empty. An input SD image signal is applied to both an adaptive processor 204 and a classification circuit 201, the latter being comprised of a class tap generator 202 and a class determining circuit 203. In classification circuit 201, an HD pixel of which a predicted value is to be found in the adaptive process (hereinafter referred to as a marked-pixel) is classified into a predetermined class based on characteristics of a set of SD pixels in a close, predetermined positional relationship to the marked pixel. The pixel values for this set of SD pixels associated with the marked HD pixel are referred to as the class taps of the marked pixel.

Class taps based on the input SD image are extracted within class taps generator 202 and provided to class determining circuit 203, which detects a pattern of the set of SD pixels forming class taps for each marked pixel. The pattern is based on the characteristics of each of the pixels in the set, which are a function of the pixel values. For instance, one pattern may correspond to evenness of the pixels, a second may correspond to pixel values increasing in an upper right direction, a third may correspond to pixel values increasing in a lower left direction, and so forth. A value previously allotted to the detected pattern is then supplied to adaptive processor 204 as indicative of the class of the marked pixel.

Figure 19:
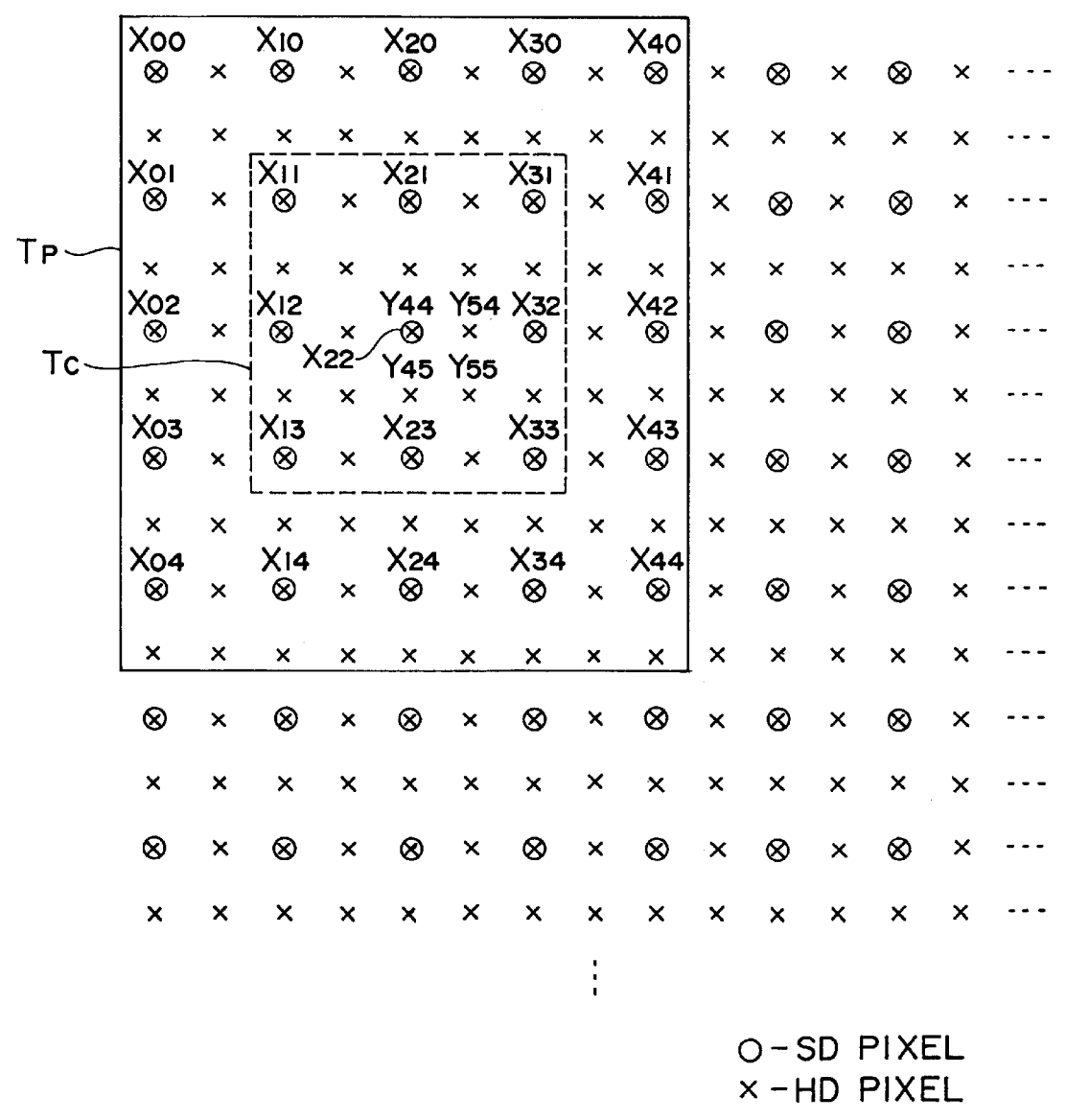

FIG. 19 illustrates the positional relationship of class taps to associated HD pixels. It is assumed that an HD image is composed of the pixels shown marked as x's and that a corresponding SD image is composed of pixels marked as O's. The shown SD image thus contains one fourth the number of pixels as the HD image. The spacings between the midpoints of the HD columns and between the HD rows are half that for the SD columns and rows. In FIG. 19, an SD pixel at a position (i+1) from the left (SD column i+1) and (j+1) from the top (SD row (j+1)) is expressed as $X_{ij}$. Similarly, an HD pixel positioned in HD column (i'+1) and HD row (j'+1) is expressed as $Y_{i'j'}$. Thus, for example, the position of the SD pixel $X_{ij}$ and the HD pixel $Y_{(2i)(2j)}$ coincide with one another. (It is noted here that "class taps" and "predictive taps" are actually image data values for particular pixels. However, for simplicity in the description, the "taps" will be described as being the pixels themselves, and vice versa).

To illustrate how class taps are defined, a marked pixel is assumed to be HD pixel $Y_{44}$, which has the identical position as SD pixel $X_{22}$. The class taps for this marked pixel are the closest nine SD pixels within a 3×3 SD pixel square centered about the marked HD pixel $Y_{44}$. Thus, in FIG. 19, the class taps are the SD pixels inside the region defined by boundary $T_c$, that is, SD pixels $X_{11}, X_{21}, X_{31}, X_{12}, X_{22}, X_{32}, X_{13}, X_{23}, X_{33}$. Class generator 202 extracts the pixel values for these SD pixels as the class taps for the marked pixel. For the case in which the marked pixel is adjacent to an HD pixel that coincides with an SD pixel, the same class taps as for the coinciding HD pixel can be defined. Thus, for instance, if the marked pixel is either $Y_{54}, Y_{55}, Y_{45}$, etc. then the class taps for any of these HD pixels may be the same as those for "coinciding" HD pixel $Y_{44}$. It is also possible to form different class taps for non-coinciding pixels such as $Y_{54}, Y_{55}$ or $Y_{45}$.

In classification circuit 203, the pattern of the class taps of a marked pixel are detected (which class taps are provided by class taps generator 202). In other words, the pattern such as evenness, etc., of the nine SD pixels in close positional relationship to the marked pixel are detected to ascertain which class should be assigned to the marked pixel. A pattern value corresponding to the detected pattern is then outputted as the class of the marked pixel, and supplied to the address terminal (AD) of a coefficients read only memory (ROM) 207 in adaptive processor 204.

Ordinarily, 8 bits or the like are allotted to a pixel which forms an image. Assuming that 8 bits are allotted to an SD pixel, for example, if nine SD pixels are employed for the class taps as in the example of FIG. 19, the number of possible pixel values per class tap is as high as $(2^8)^9$. Consequently, the ability to perform pattern detection processing operations at high speeds is inhibited.

Therefore, before classification is performed, it is desirable to decrease the number of bits allotted to an SD pixel of a class tap. For instance, adaptive dynamic range coding (ADRC) may be executed to implement such bit reduction. As a first step in the ADRC process, a pixel having the maximum pixel value out of nine SD pixels forming a process block (hereinafter referred to as a maximum pixel) and a pixel having the minimum pixel value in the process block (hereinafter referred to as a minimum pixel) are detected. The difference DR between the pixel value MAX of the maximum pixel and the pixel value MIN of the minimum pixel is then computed. The value DR is designated as a local dynamic reference value of the process block, and the respective pixel values forming the process block are quantized again with a smaller number K of bits for each pixel than the originally allotted number of bits. In other words, the pixel value MIN of the minimum pixel is subtracted from respective pixel values forming the process block, and the respective subtraction results are divided by DR/2K. As a result, respective pixel values composing the process block can be expressed by K bits. Thus, for example, when K=1, the maximum number of patterns of nine SD pixels is $(2^1)^9$. Accordingly, the maximum number of patterns is dramatically decreased as compared to when ADRC processing is not implemented.

With continuing reference to FIG. 18, the adaptive process is performed within adaptive processor 204, which includes predictive taps generator 205, predicted value calculator 206 and prediction coefficients ROM 207. In predictive taps generator 205, data of a number of SD pixels are extracted which are in a predetermined positional relationship to the marked pixel. These extracted pixels are provided as predictive taps x1, x2, . . . to predicted value calculator 206, which determines a predicted value for an HD pixel based on prediction coefficients and the predictive taps.

The predictive taps correspond to pixels having high positional correlation with the marked HD pixel. By way of example, if the marked pixel is pixel $Y_{44}$ as shown in FIG. 19, and class taps within boundary $T_c$ are formed as explained previously, then predictive tap generator 205 may determine the predictive taps as the block of 5×5 SD pixels falling within the area enclosed by boundary $T_p$, i.e, SD pixels $X_{00}$ to $X_{44}$. If the marked pixel is a pixel adjacent to $Y_{44}$ such as pixel $Y_{54}, Y_{45}$ or $Y_{55}$, then the same predictive taps are formed as those for pixel $Y_{44}$, i.e., corresponding to pixels $X_{00}$ to $X_{44}$. It is possible, however, to define different predictive taps when a non-coinciding pixel such as $Y_{45}, Y_{54}$ or $Y_{55}$ is the marked pixel.

Prediction coefficients ROM 207 stores prediction coefficients which are found by learning performed beforehand by classes. When ROM 207 receives a class supplied from classification circuit 203, ROM 207 reads prediction coefficients stored in an address therein corresponding to the supplied class, and supplies the prediction coefficient(s) to predicted value calculator 206.

Accordingly, predictive taps corresponding to a marked-pixel and the prediction coefficient(s) concerning the class of the marked-pixel are both supplied to calculator 206. Within calculator 206, the operation in accordance with equation (3) above is performed using prediction coefficients w1, w2, . . . received from ROM 207 and SD pixel data x1, x2, . . . which form the predictive taps from predictive tap generator 205. As a result, the predicted value E[y] of the marked-pixel y is determined, and it is outputted as a pixel value for an HD pixel. The process is repeated by designating each HD pixel as a marked-pixel, and when all HD pixels have been so designated and predicted values derived therefor, a complete SD image is converted into an HD image.

Figure 20:
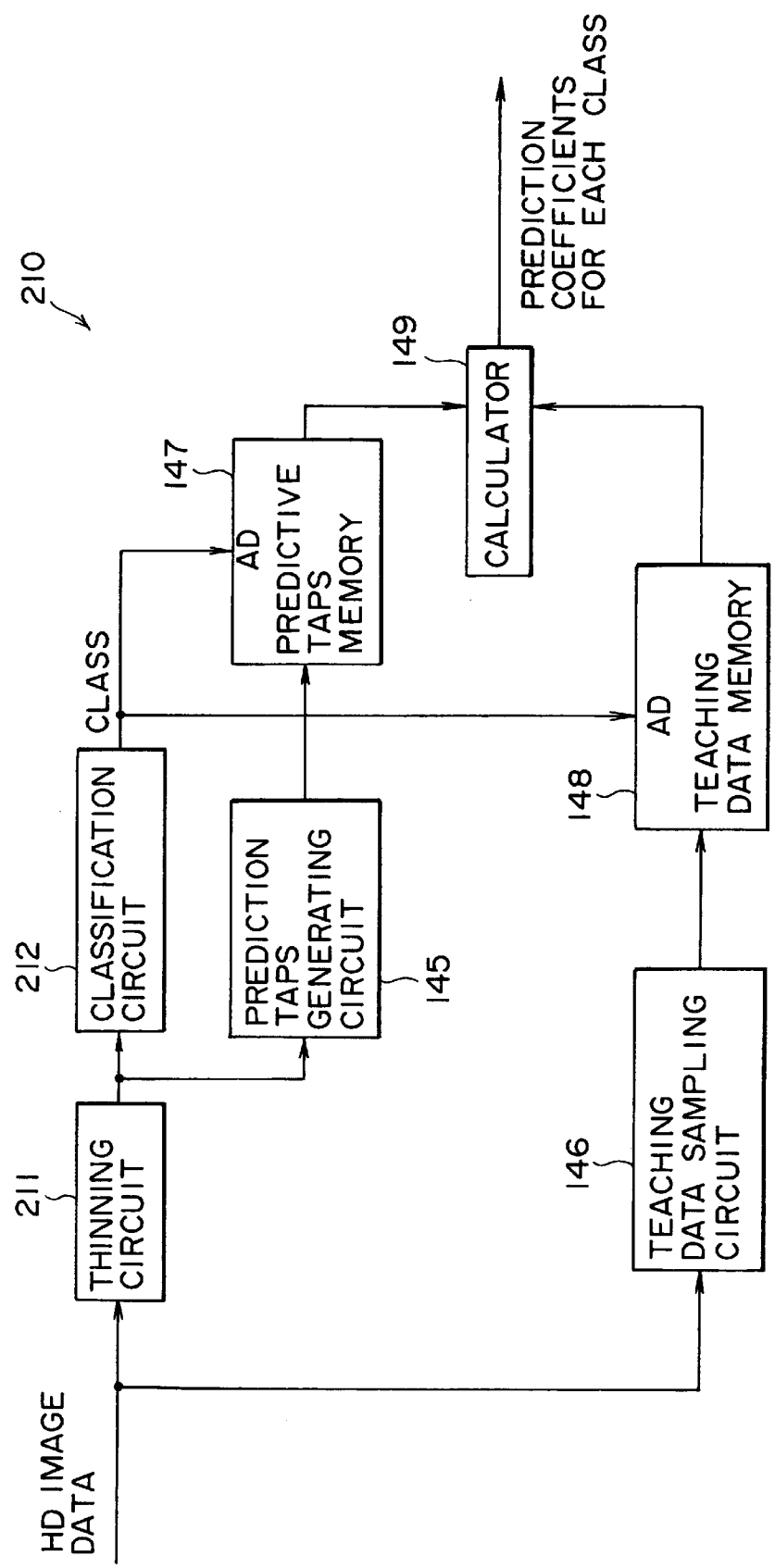
FIG. 20 is a block diagram of a learning device for determining prediction coefficients.

Referring now to FIG. 20, there is shown a block diagram of a learning device 210 that performs a learning process for calculating prediction coefficients to be stored in ROM 207 of FIG. 18. HD image data which is to be the teacher data in the learning process is supplied to both a thinning circuit 211 and a teacher data sampling circuit 146. In thinning circuit 211, the number of pixels of the HD image is decreased by thinning such that the HD image is converted into an SD image. The number of HD image pixels is halved in both the horizontal and vertical directions to thereby form the SD image. The SD image is supplied to classifying circuit 212 and predictive tap generator 145. It is noted, rather than forming the SD image from the HD image, an SD image may be applied directly to classification circuit 212 from an SD camera corresponding to an HD image from an HD camera.

In classification circuit 212 or predictive taps generator 145, the same processes as those performed in classification circuit 201 or predictive taps generator 205 of FIG. 18 are performed, whereby the class of a marked-pixel or the predictive taps are outputted, respectively. The classes outputted by classifying circuit 212 are applied to the address terminals (AD) of both predictive taps memory 147 and teacher data memory 148. The predictive taps outputted from predictive tap generator 145 are applied to predictive taps memory 147 where the taps are stored at addresses corresponding to the classes supplied from classifying circuit 212.

In teacher data sampling circuit 146, HD pixels to be marked-pixels in classification circuit 212 and predictive tap generating circuit 145 are extracted out of the HD image supplied thereto. The extracted taps are stored in teacher data memory 148 as the teacher data along with the computed class at a common address location. The process is repeated for all HD pixels of the HD images inputted to device 210 for the purpose of learning. Since predictive tap memory 147 and teacher data memory 148 are each configured to store a plurality of types of information at the same address location, a plurality of learning data x and teacher data y to be classified in the identical class can be stored at essentially the same address location.

Calculator 149 then reads predictive taps as learning data or HD pixel data as teacher data stored at the same address locations from predictive tap memory 147 or teacher data memory 148, respectively. Based on this data, calculator 149 computes prediction coefficients, e.g, by the least square method which minimizes error between the predicted values and the teacher data. In other words, in calculator 149, the above-described prediction equations (10) are formed by classes, and prediction coefficients are obtained in solving these equations. The prediction coefficients are then stored at the address locations corresponding to the classes in coefficient ROM 207 of FIG. 18. It is noted that independent equations (10) are solved for each "non-coinciding" HD pixel such as pixel $Y_{45}$, $Y_{54}$ or $Y_{55}$ in FIG. 19 and for each "coinciding" pixel $Y_{44}$ even though the predictive taps are the same.

In the example of FIG. 19, nine class taps and 25 predictive taps were formed for each marked HD pixel, and the classification and adaptive processes (hereinafter referred to as the classification adaptive process) were performed accordingly. However, for marked HD pixels near the edge of an image area, the assumption of nine class taps and 25 predictive taps is no longer valid. Thus, it is desirable to form class and predictive taps of different arrangements for those HD pixels, and to compute predictive coefficients in a similar manner as that described above to cover these special cases.

Accordingly, the above-described classification-adaptive process is employed to supplement pixel creation in resolution creating memory 15i when HD pixels are not otherwise created in accordance with the associated motion vector. For instance, following a scene change, it will take several frames of motion to generate an HD image from an SD image based on motion alone. Hence, in the initial frames following a scene change, the classification adaptive procedure may be employed often.

WRITING DATA IN ACCORDANCE WITH THE MOTION VECTOR

As mentioned previously in connection with the embodiment of FIG. 4, in order to practically create pixels at positions corresponding to image motion, each motion vector may be rounded off to a distance corresponding to the spacing between midpoints of adjacent high resolution pixels. Thus, for example, for the embodiment in which HD pixel data is generated from SD pixel data, if the motion vector of any given frame corresponds to motion of between 0.5 and 1.5 HD pixel spacings in the vertical (or horizontal) direction, the motion vector may be rounded off to one HD pixel spacing in the vertical (or horizontal) direction and the address pointer moved accordingly to write new SD data into the memory. As an alternative, the address pointer can be caused to move only if the motion vector is approximately equal to, or within a predetermined range of, an integral multiple of an HD pixel interval (i.e., an integral multiple of ½ the SD pixel interval). In this case, there will be many instances where there is no change in the address pointer, leading to more frequent empty addresses for HD pixel data in resolution creating memory 15i. Thus, the empty addresses can be filled by interpolation or via the classification adaptive process.

As another alternative to rounding off the motion vector to create high resolution pixel data in accordance therewith, a different approach is to create an even higher resolution storage array (enlarged access area) within resolution creating memory 15 or 15i to reduce the round off error of the motion vectors. Then, when the yet higher resolution frame is generated, pixel data can be read out by skipping some of the data, e.g., by skipping alternate rows and alternate columns, to generate a high resolution image, but with not quite as high resolution as could be realized.

Figure 21:
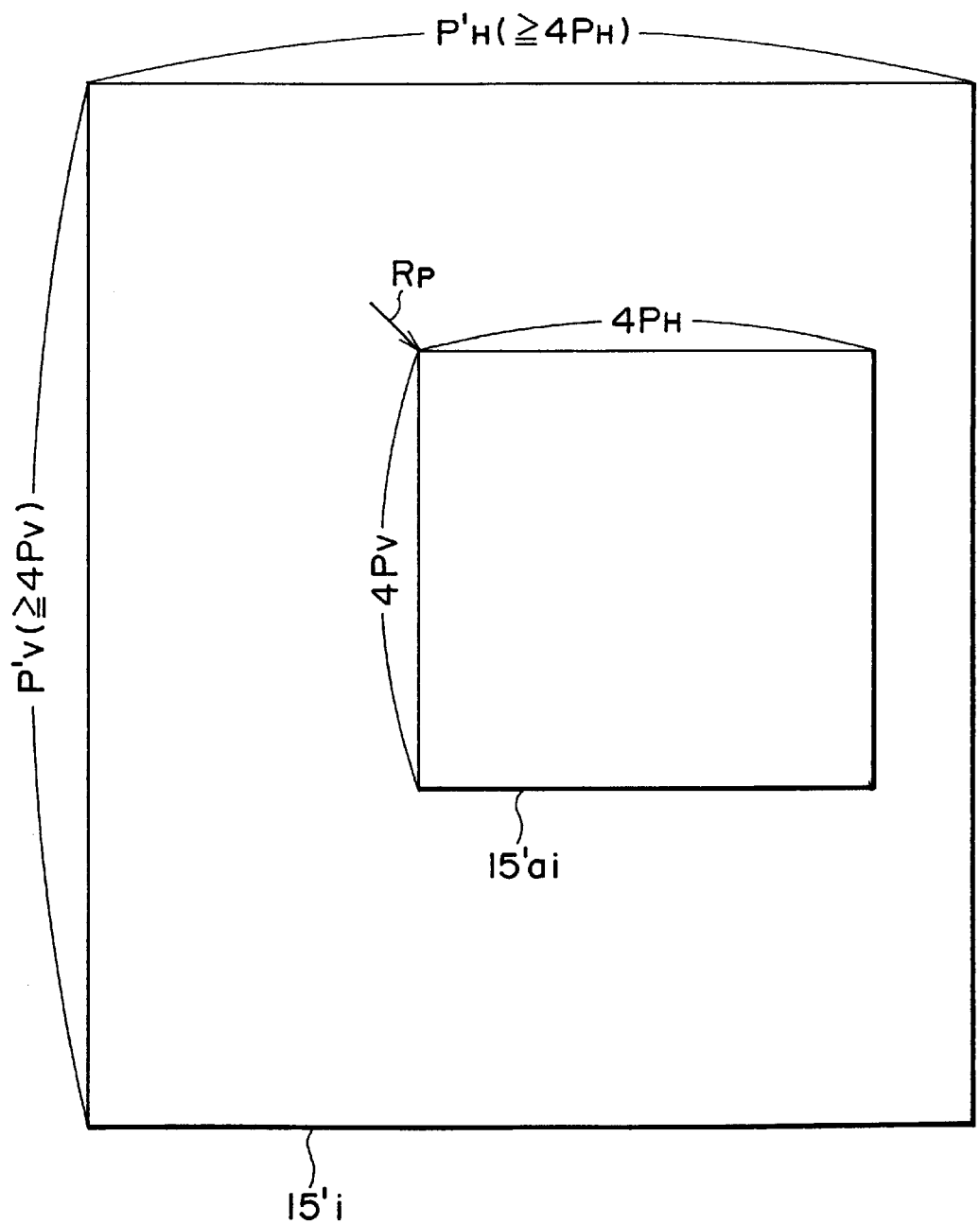
FIG. 21 illustrates data storage within a resolution creating memory with an enlarged access area.

To illustrate the latter approach, the aforedescribed resolution converter 34, which is designed to convert an SD image into an HD image, can be modified by employing a resolution converting memory 15i' with four times as many pixel storage locations as the SD image in both the horizontal and vertical directions, i.e., with 16 times as much pixel density as compared to the SD image. This approach is illustrated in FIG. 21, in which memory 15i' is designed with $P_H' >= 4P_H$ columns and $P_V' >= 4P_V$ rows, where $P_H$ and $P_V$ are the number of pixels in horizontal and vertical directions, respectively, of an SD frame. Access area 15a_i is designed with $4P_H \times 4P_V$ pixels. Relative address pointer $R_p$ controls the precise location of access area 15a_i within the larger memory area of memory 15i in essentially the same manner as explained previously.

SD pixels are written every fourth position in access area 15a_i' in both horizontal and vertical directions after moving the relative address pointer in accordance with the motion vector. The motion vector is rounded off to units corresponding to ¼ the SD pixel spacing prior to determining the relative address pointer. However, even in this case, if the x and y components of the motion vector of the SD image deviate significantly from an integral multiple of ¼ of the SD pixel spacing, additional SD pixel data may not be written into the memory. For instance, if the motion vector is determined to be less than ⅛ of the SD pixel spacing, the new high resolution frame may be formed as identical to the previous high resolution frame, and no new SD pixel data is written.

Figure 22:
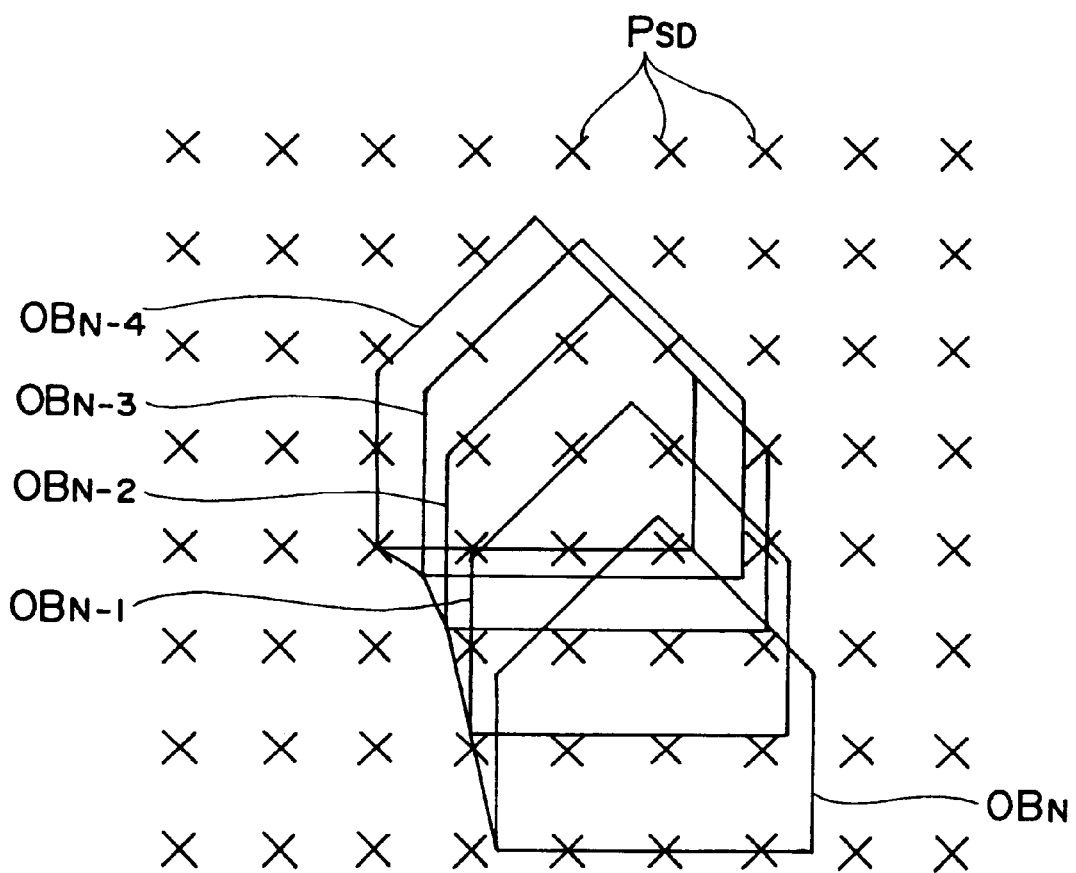
FIG. 22 illustrates frame to frame movement of an image.
Figure 23:
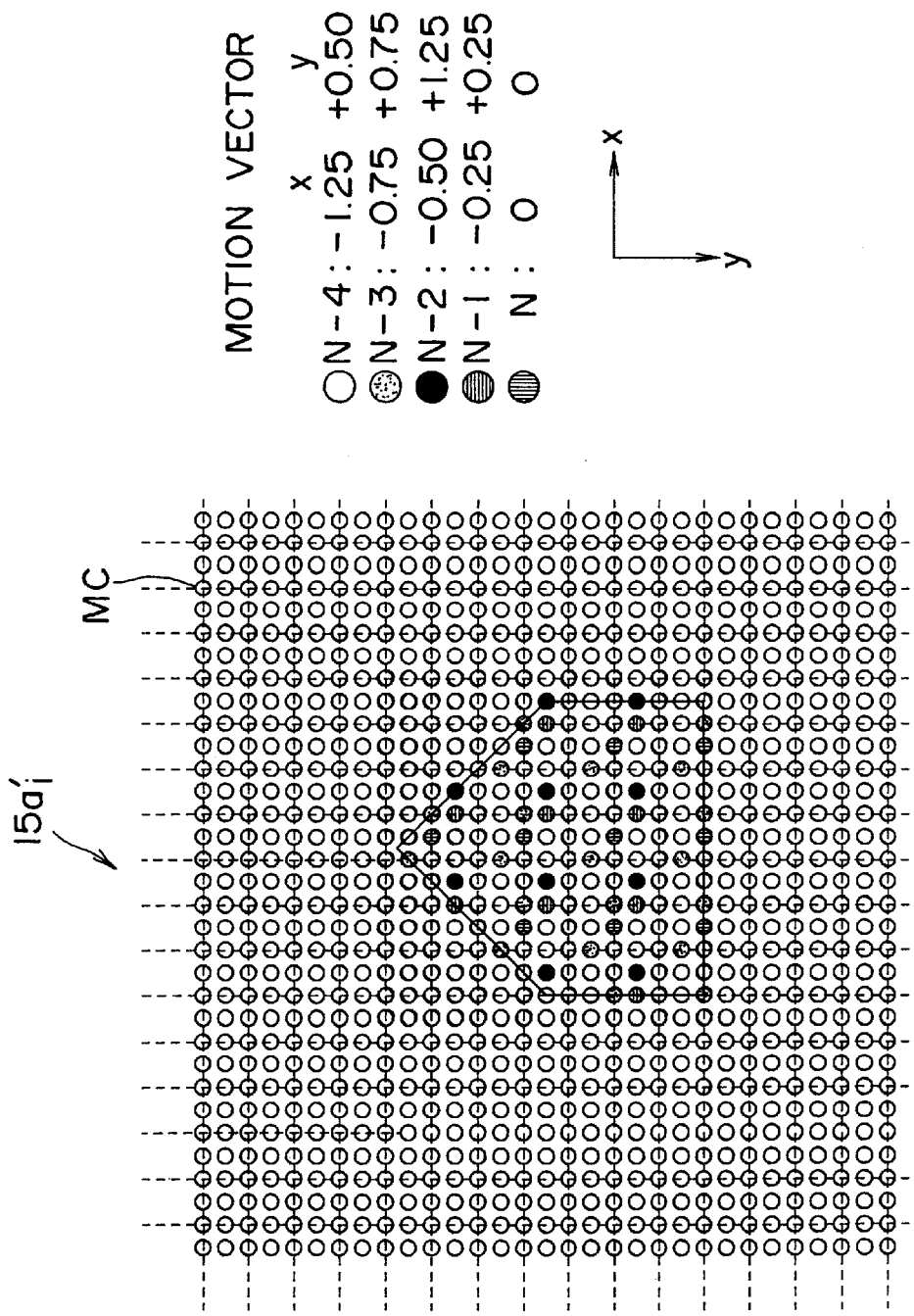
Figure 25:
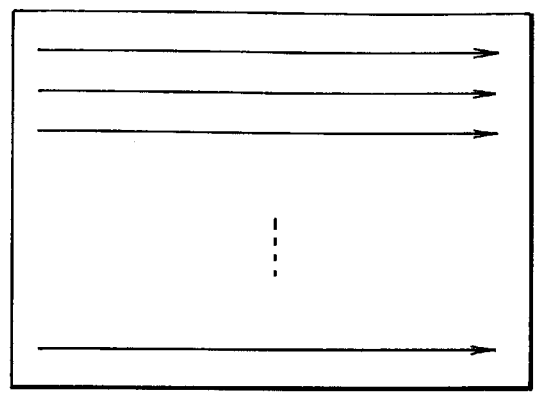
FIG. 25 illustrates horizontal scanning lines of a CRT display.
Figure 26:
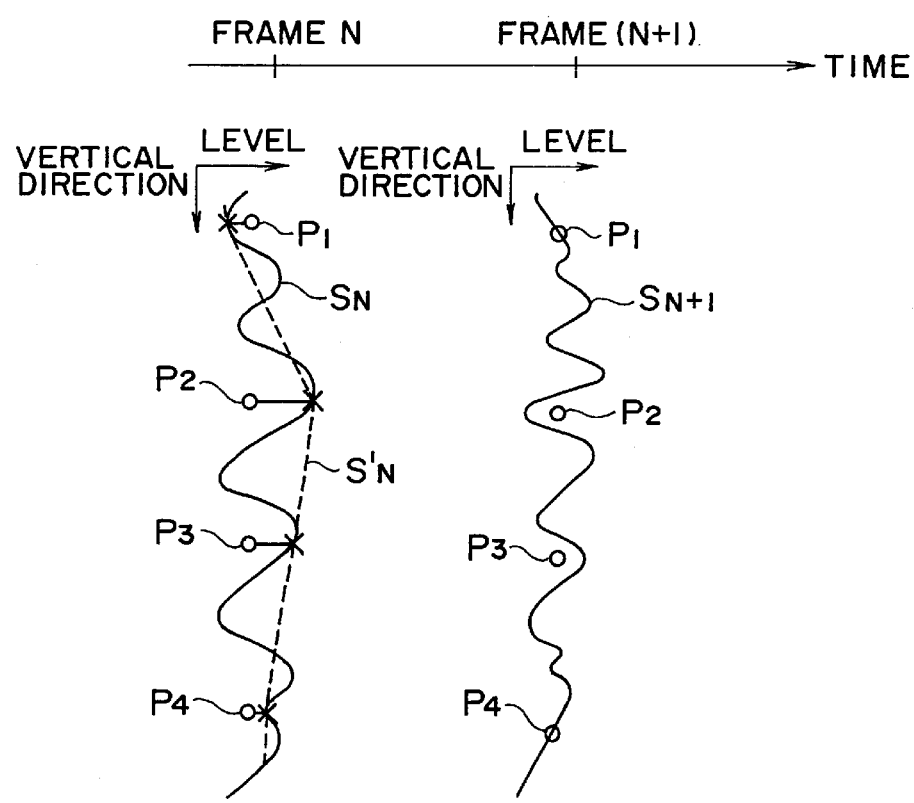
FIG. 26 illustrates undersampling of an image signal in the vertical direction.

FIGS. 22–24 further illustrate the enlarged access area approach. FIG. 22 illustrates a portion of an SD pixel layout of pixels $P_{SD}$. An object $OB_{N-4}$ is assumed to be formed by the pixels in frame (N–4). The object's position moves from frame to frame until it reaches the position of object $OB_N$ in frame N. The pixels forming the image are written in the access area enlarged to the area of $4P_H \times 4P_V$ as described immediately above. The storage states are shown in the access area $15a_i'$ of FIG. 23, where the pixels of different frames are shown with different shadings. The motion vectors corresponding to the frame to frame motion are also tabulated in FIG. 23. FIG. 24 is an enlarged view of the memory storage locations or cells MC of FIG. 23. After four frames of motion from frame (N–4) to frame N, many of the storage locations remain empty. These can be filled in by interpolation, by the classification adaptive process, and so forth. As another option, an empty location can be filled by simply inserting the same pixel value of the nearest storage location into the empty location.

The dashed lines shown in FIGS. 23 and 24 designate alternate rows and columns of pixel data. To read out HD pixel data from access area $15a_i'$, it is sufficient to read data of every other row and every other column, i.e., the data from storage locations along the dashed lines. This method will produce higher resolution than that realizable by employing an access area with only a $2P_H \times 2P_V$ array of storage locations.

Referring to FIG. 27, another embodiment 34' of resolution converter 34 is shown. This embodiment is similar to that of FIG. 12, except it is designed for the case in which the complete image of each frame moves together by the same amount from frame to frame. That is, resolution converter is functionally similar to distortion corrector 4a of FIG. 4. Thus, a single high resolution image generator 41 without a switch 22 or buffer memory 23 is used in place of high resolution object generators 411-41M, and area divider 21 and combiner 24 are eliminated. All other aspects are the same as described above for the embodiment of FIG. 12.

In each of the above-described embodiments of the invention employing a resolution creating memory 15 or $15_j$, when previous high resolution frame data was already created in the resolution creating memory, storage of data from the next frame, i.e., from present frame memory 11A, was disclosed to be accomplished by moving the address pointer in accordance with the motion vector, and overwriting some of the prior data. As an alternative to that approach, the motion vector of the previous frame can be stored and compared with the motion vector of the present frame to determine which motion vector has x and y components closest to the distance corresponding to one high resolution pixel interval, and data stored accordingly. In other words, data associated with the motion vector that has a smaller round off error would be selected for storage. For the memory of FIG. 23, this would mean selecting data associated with the motion vector closest to an integer multiple of ¼ of an SD pixel interval.

While the present invention has been particularly shown and described in conjunction with preferred embodiments thereof, it will be readily appreciated by those of ordinary skill in the art that various changes and modifications may be made to the disclosed embodiments without departing from the spirit and scope of the invention. For example, while the disclosed embodiments were described to reduce aliasing distortion and optionally to generate high resolution images, the invention can also be employed to enlarge images. Further, while the above processes are disclosed as processing data on a frame to frame basis, the processes can be employed to process portions of frames, such as in units of fields. Also, images can be displayed on other displays aside from a CRT such as a liquid crystal display. Further, the received image signal may be a digital image signal. In this case, the A/D converter (e.g., of FIG. 1 or 11) can be removed. Moreover, the present invention may be employed to convert an interlaced scanning image to a progressive scanning image. Accordingly, these and other changes and modifications are intended to be included within the scope of the invention as defined by the appended claims.

What is claimed is:

1. An image signal converting apparatus for converting a first image signal into a second image signal, said first and second image signals each comprising a plurality of pictures of different frames, said apparatus comprising:

a motion detector operable to detect motion of the first image signal between a first frame and a second frame, said motion being detected by a finer amount than a pixel size of said first image signal; and processing circuitry for producing the second image signal based on an assumption of a pixel in a frame of said second image signal at a position corresponding to the detected motion.

2. The apparatus of claim 1 wherein the second image signal is of higher resolution than the first image signal.

3. The apparatus of claim 1 wherein the second image signal has pixel data of a larger number of pixels than the first image signal.

4. The apparatus of claim 3 wherein said processing circuitry produces the second image signal having pixel data of more pixels than the first image signal in a direction normal to scanning lines associated with the first image signal.

5. The apparatus of claim 1 wherein said first and second frames are adjacent frames.

6. The apparatus of claim 1 wherein each of said plurality of pictures of different frames comprises the picture of a complete frame.

7. The apparatus of claim 1 wherein each of said plurality of pictures of different frames comprises a picture of a portion of each frame.

8. The apparatus of claim 1, further comprising a low pass filter for filtering out high frequency components of said second image signal.

9. The apparatus of claim 1 wherein said processing circuitry includes:

a resolution creating memory for storing a picture of the first image signal and having a larger storage capacity than an amount of data within one picture of the first image signal; and, a controller operable to control writing of first image signal data in said resolution creating memory and to control reading of data of a new image signal from said memory having higher quality than said first image signal, said controller writing the first image signal data in said memory in accordance with the detected motion of the first image signal.

10. The apparatus of claim 9 wherein said controller controls reading of said new image signal as said second image signal.

11. The apparatus of claim 9, further comprising a scene change detector for detecting a scene change of said first image signal and generating a scene change signal in accordance therewith, said controller being responsive to said scene change signal to reset values within storage locations of said memory to predetermined values.

12. The apparatus of claim 9, wherein:
   data of said first frame of said first image signal is caused to be stored at first storage locations of said resolution creating memory; and
   data of said second frame of said first image signal is caused to be stored at second storage locations of said memory that are each shifted with respect to said first storage location by an amount corresponding to the motion of said first image signal between said first and second frames, to thereby produce data of a higher quality frame containing both said first frame data and said second frame data.

13. The apparatus of claim 12 wherein:
   said first frame data is stored in said resolution creating memory in a first access area therein;
   said second frame data is caused to be stored in a second access area of the same size as said first access area without all said first frame data being erased, said second access area being shifted with respect to said first access area in correspondence with said detected motion; and
   said controller being operative to provide a relative address pointer to said memory which determines the locations of said first and second access areas.

14. The apparatus of claim 9 wherein said processing circuitry includes:
   a detector for detecting empty positions in said memory in which data of the first image signal is not stored; and
   a pixel generator for generating pixel data at the empty positions.

15. The apparatus of claim 14 wherein said detector includes a flag memory for storing flags indicating which storage positions of said resolution creating memory contain stored image data of said first image signal.

16. The apparatus of claim 14 wherein said pixel generator is operative to determine image values for pixels at positions corresponding to said empty locations by interpolation between already stored pixel data in neighboring storage positions of said empty positions.

17. The apparatus of claim 14 wherein said pixel generator includes:
   a determiner for detecting characteristics of the first image signal and determining a class corresponding to the detected characteristics;
   a prediction data memory for storing prediction data for each class; and
   circuitry for generating said pixel data for an empty storage position in accordance with prediction data read out from the prediction data memory corresponding to the determined class.

18. The apparatus of claim 17 wherein the prediction data for each class is produced by learning using at least a learning image signal having a higher resolution than the first signal.

19. An image signal converting apparatus for converting a first image signal into a second image signal, said first and second image signals each comprising a plurality of pictures of different frames, said apparatus comprising:
   a motion detector operable to detect motion of the first image signal between a first frame and a second frame in at least first and second regions of each frame, said motion being detected by a finer amount than a pixel size of said first image signal;
   an area divider for defining at least first and second image areas of a picture of the first image signal based on at least the detected motion;
   processing circuitry for producing first and second image areas of the second image signal based on an assumption of pixels in a frame of said second image signal at positions corresponding to the detected motion in the respective first and second image areas; and
   a combiner for combining the first and second image areas of the second image signal to form a composite image signal.

20. The apparatus of claim 19 wherein the second image signal is of higher resolution than the first image signal.

21. The apparatus of claim 19 wherein the second image signal has pixel data of a larger number of pixels than the first image signal.

22. The apparatus of claim 19 wherein said second image signal is produced with pixel data of more pixels than the first image signal in a direction normal to scanning lines associated with the first image signal.

23. The apparatus of claim 19, further comprising a filter for filtering the second image signal.

24. The apparatus of claim 19 wherein said processing circuitry comprises first and second circuit parts for performing separate processing operations on said first and second image areas of said first signal, each circuit part including:
   a resolution creating memory for storing data within the respective image area of the first image signal and having a larger storage capacity than an amount of data within one picture of the first image signal; and
   a controller operable to control writing of first image signal data in said resolution creating memory and reading data of a new image signal from said memory having higher quality than said first image signal, said controller writing the first image signal data in said memory in accordance with the detected motion of the first image signal in the associated image area.

25. The apparatus of claim 24, further comprising a scene change detector for detecting a scene change of said first image signal and generating a scene change signal in accordance therewith, each said controller being responsive to said scene change signal to reset values within storage locations of the associated resolution creating memory to predetermined values.

26. The apparatus of claim 24 wherein said output unit comprises a frame memory for storing said filtered second signal, with data being read out from said frame memory by periodically skipping lines of data to produce said output signal with less quality than said second image signal.

27. The apparatus of claim 24 wherein each said circuit part of said processing circuitry includes:
   a detector for detecting empty positions in the associated resolution creating memory in which data of the first image signal is not stored; and
   a pixel generator for generating pixel data at the empty positions.

28. The apparatus of claim 27 wherein said detector includes a flag memory for storing flags indicating which storage locations of said resolution creating memory contain stored image data of said first image signal.

29. The apparatus of claim 27 wherein said pixel generator is operative to determine image values for pixels at positions corresponding to said empty locations by interpolation between already stored pixel data in neighboring storage locations of said empty locations.

30. The apparatus of claim 27 wherein said pixel generator includes:
    a determiner for detecting characteristics of the first image signal and determining a class corresponding to the detected characteristics;
    a prediction data memory for storing prediction data for each class; and
    circuitry for generating said pixel data for an empty storage location in accordance with prediction data read out from the prediction data memory corresponding to the determined class.

31. The apparatus of claim 30 wherein the prediction data for each class is produced by learning using at least a learning image signal having a higher resolution than the first signal.

32. The apparatus of claim 1 wherein said first image signal comprises a standard definition (SD) signal and said second image signal comprises a high definition (HD) signal with higher resolution than said SD signal in both horizontal and vertical directions.

33. The apparatus of claim 9 wherein:
    said first image signal represents a standard definition (SD) image and said second image signal represents a high definition (HD) image with higher resolution than said SD image in both horizontal and vertical directions; and,
    an access area is defined within said resolution creating memory for each high resolution picture created, with storage locations corresponding to twice as many pixels in the horizontal direction and twice as many pixels in the vertical direction as said SD image.

34. The apparatus of claim 9 wherein:
    said first image signal represents a standard definition (SD) image and said second image signal represents a high definition (HD) image with higher resolution than said SD image in both horizontal and vertical directions;
    an access area is defined within said resolution creating memory for each high resolution picture created, with storage locations corresponding to four times as many pixels in the horizontal direction and four times as many pixels in the vertical direction as said SD image; and
    pixel data is caused to be read out from said resolution creating memory by skipping alternate storage locations to thereby form an HD image with twice as many pixels in each of the horizontal and vertical directions as said SD image.

35. A method for converting a first image signal into a second image signal, each of said first and second image signals comprising a plurality of pictures of different frames, said method comprising the steps of:
    detecting motion of said first image signal between a first frame and a second frame, said motion being detected by a finer amount than a pixel size of said first image signal;
    generating pixel data by assuming a pixel in a frame of said second image signal at a position corresponding to said detected motion; and
    producing said second image signal based on said generated pixel data.

36. The method of claim 35 wherein the second image signal is produced with higher resolution than the first image signal.

37. The method of claim 35 wherein the second image signal is produced with pixel data of a larger number of pixels than the first image signal.

38. The method of claim 37 wherein the second image signal is produced with pixel data of more pixels than the first image signal in a direction normal to scanning lines associated with the first image signal.

39. The method of claim 35 wherein said first and second frames are adjacent frames.

40. The method of claim 35, further comprising the step of low pass filtering said second image signal to reduce any aliasing distortion that may be present therein.

41. The method of claim 35, further including the steps of:
    storing a picture of the first image signal in a resolution creating memory having a larger storage capacity than an amount of data within one picture of the first image signal;
    controlling writing of first image signal data in said resolution creating memory in accordance with the detected motion of the first image signal; and
    controlling reading of data of a new image signal from said memory, said new image signal being of a higher quality than said first image signal.

42. The method of claim 41 wherein said step of controlling reading comprises controlling reading of data of said new image signal as said second image signal.

43. The method of claim 41, further comprising the steps of:
    detecting a scene change of said first image signal; and,
    resetting data within storage locations of said resolution creating memory to predetermined values when a scene change is detected.

44. The method of claim 41, further comprising generating a relative address pointer in accordance with the detected motion and writing image data of said second frame into said memory at locations according to the relative address pointer without erasing all image data within said memory of said first frame, to thereby produce data of a higher quality frame containing both said first frame data and said second frame data in which said second frame data is stored at locations that are shifted with respect to storage locations storing said first frame data.

45. The method of claim 41, further comprising the steps of:
    detecting empty positions in said memory in which data of the first image signal is not stored; and
    generating pixel data for pixels corresponding to the empty positions.

46. The method of claim 45 wherein said step of detecting includes storing flags indicating which storage positions of said resolution creating memory contain stored image data of the first image signal.

47. The method of claim 45 wherein said step of generating pixel data comprises interpolating between image values of neighboring pixels of which pixel data is already stored.

48. The method of claim 45 wherein said step of generating pixel data includes:
    detecting characteristics of the first image signal and determining a class corresponding to the detected characteristics;
    storing prediction data in a prediction data memory for each class; and
    generating said pixel data for an empty storage position in accordance with prediction data read out from the prediction data memory corresponding to the determined class.

49. The method of claim 45 further comprising producing the prediction data for each class by learning using at least a learning image signal having a higher resolution than the first signal.

50. The method of claim 35 wherein said first image signal comprises a standard definition (SD) signal and said second image signal comprises a high definition (HD) signal with higher resolution than said SD signal in both horizontal and vertical directions.

51. The method of claim 41 wherein said first image signal represents a standard definition (SD) image and said second image signal represents a high definition (HD) image with higher resolution than said SD image in both horizontal and vertical directions; and said method further comprising the step of:

storing SD image data within an access area of said resolution creating memory for each high resolution picture created, each access area having storage locations corresponding to twice as many pixels in the horizontal direction and twice as many pixels in the vertical direction as said SD image.

52. The method of claim 41 wherein said first image signal represents a standard definition (SD) image and said second image signal represents a high definition (HD) image with higher resolution than said SD image in both horizontal and vertical directions; and said method further comprising the step of:

storing SD image data within an access area of said resolution creating memory for each high resolution picture created, each access area having storage locations corresponding to four times as many pixels in the horizontal direction and four times as many pixels in the vertical direction as said SD image; and reading out pixel data from said resolution creating memory by skipping alternate storage locations to thereby form an HD image with twice as many pixels in each of the horizontal and vertical directions as said SD image.

53. The method of claim 35, wherein said step of detecting motion comprises detecting the motion of said first image signal by a finer amount than a pixel size of said first image signal in a plurality of image areas of a picture thereof, and further including the steps of:

defining at least first and second image areas of said picture of the first image signal based on at least the detected motion;

producing first and second image areas of the second image signal based on an assumption of pixels at positions corresponding to the detected motion in the respective first and second image areas; and combining the first and second image areas of the second image signal to form a composite image signal.

54. The apparatus of claim 1 wherein said first image signal is a motion image signal, said second image signal is a still image signal, and the assumption of a pixel at a position corresponding to the detected motion is processed for each frame of the motion image signal.

55. The apparatus of claim 19 wherein said first image signal is a motion image signal, said second image signal is a still image signal, and the assumption of a pixel at a position corresponding to the detected motion is processed for each frame of the motion image signal.

56. The method of claim 35 wherein said first image signal is a motion image signal, said second image signal is a still image signal, and the assumption of a pixel at a position corresponding to the detected motion is processed for each frame of the motion image signal.

57. A method of converting a first moving image signal into a second image signal, said method comprising the steps of:

detecting motion of said first image signal between a first frame and a second frame thereof, said motion being detected by a finer amount than a pixel size of said first image signal;

writing data of the first frame of said first image signal to a resolution creating memory at distributed first addresses that are referenced to a first address pointer, said first addresses being a fraction of all addresses in said memory;

determining a second address pointer that is shifted with respect to said first address pointer by an amount equal to, but in an opposite direction as, said detected motion between the first and second frames; and, writing data of the second frame of said first image signal to said resolution creating memory at second distributed addresses that are referenced to said second address pointer, thereby incrementally forming a picture of said second image signal in said resolution creating memory with pixels assumed at positions corresponding to the detected motion.

58. The method of claim 57, further comprising reading out more data in a complete frame or predetermined frame portion of said second image signal from said memory than the amount of data in one complete frame or predetermined frame portion, respectively, of said first image signal, to thereby generate an output image signal of higher resolution than said first image signal.

59. The method of claim 57, wherein said resolution creating memory has N times as many horizontal lines as said first image signal, N being an integer greater than one, and further comprising reading out every M horizontal lines from said memory while skipping lines in between, where M is an integer greater than one.

60. The method of claim 59, wherein M equals N such that said output signal has the same number of horizontal lines as said input image signal but with aliasing distortion in the vertical direction removed.

61. A method for converting an input moving picture image signal to an output image signal with improved quality, comprising:

detecting motion of the input image signal between a first frame and a second frame thereof, said motion being detected by a finer amount than a pixel size of said input image signal;

generating a higher resolution second image signal from the input image signal, with N times as many horizontal lines as said input image signal, based on an assumption of a pixel in a frame of said second image signal at a position corresponding to the detected motion, and storing said second image signal in a resolution creating memory, wherein said input image signal data is written to said resolution creating memory in accordance with the detected motion to thereby generate and store said second image signal therein; and reading out data from said memory every N lines, where N is an integer greater than one, to generate said output image signal from said memory with the same number of horizontal lines as said input image signal, and with aliasing distortion in the vertical direction removed.

62. The method of claim 61, further comprising low pass filtering said output image signal in the vertical direction.

63. An image signal converting apparatus for converting an input moving picture image signal to an output image signal with improved quality, comprising:

a motion detector operable to detect motion of the input image signal between a first frame and a second frame thereof, said motion being detected by a finer amount than a pixel size of said input image signal;

processing circuitry, including a resolution creating memory and a controller, for generating a higher resolution second image signal from the input image signal, with N times as many horizontal lines as said input image signal, based on an assumption of a pixel in a frame of said second image signal at a position corresponding to the detected motion, said second image signal being stored in said resolution creating memory;

wherein said controller controls writing of input image signal data to said resolution creating memory in accordance with the detected motion to thereby generate and store said second image signal therein, and controls reading of data from said memory every N lines to generate said output image signal from said memory with the same number of horizontal lines as said input image signal, and with aliasing distortion in the vertical direction removed.

64. The apparatus of claim 57, further comprising a vertical low pass filter for filtering said output image signal in the vertical direction.

* * * * *